United States Patent [19]
Ueda et al.

[11] Patent Number: 5,835,624
[45] Date of Patent: Nov. 10, 1998

[54] COLOR CONVERSION DEVICE

[75] Inventors: Masashi Ueda; Ryohei Komiya, both of Nagoya, Japan

[73] Assignee: Brother Kogyo Kabushiki Kaisha, Nagoya, Japan

[21] Appl. No.: 735,396

[22] Filed: Oct. 21, 1996

[30] Foreign Application Priority Data

Oct. 20, 1995 [JP] Japan .................................. 7-272817

[51] Int. Cl.$^6$ ........................................... G06K 9/00
[52] U.S. Cl. ........................ 382/162; 382/167; 358/523
[58] Field of Search .................... 382/162, 167; 358/523

[56] References Cited

U.S. PATENT DOCUMENTS 5,689,349 11/1997 Plettinck et al. ..................... 358/523

*Primary Examiner*—Phuoc Tran
*Attorney, Agent, or Firm*—Oliff & Berridge, PLC

[57] ABSTRACT

When the profile data outputted from the external CPU 4 is not consistent with the contents of the memories 40 and 46 (no in S3), data in the first conversion characteristic memory 40 is rewritten with the profile data in S4. In S5, several color signals are generated. Then, in S6, the first color conversion process is attained to convert the several color signals into first intermediate signals. The second color conversion process is attained in S7 to convert the first intermediate signals into the second intermediate signals based on a stored color conversion characteristic. Thus, the third color conversion characteristic is produced in S8. In S11, with using the thus produced third color conversion characteristic, the third color conversion process is attained to convert the actually-inputted color data into control signals.

22 Claims, 14 Drawing Sheets

COLOR CONVERSION DEVICE

BACKGROUND OF THE INVENTION

1. Field of the Invention

The present invention relates to a color conversion device for converting an original color signal into a color output signal, and more particularly to the color conversion device which can convert the original color signal into a color output signal with an enhanced process speed.

2. Description of the Related Art

Recently, several kinds of image processing devices are connected through a network structure. There arises, however, a problem that different devices may not reproduce the same colors from the same color data. A so-called device independent color system is proposed to solve this problem.

According to the device independent color system, as shown in FIG. 1, when color data is to be transmitted from one image processing device to another, the color data is converted into color values defined by the Commission Internationale de L'Eelarage (CIE). (The color values will be referred to as CIE values hereinafter.) Representative examples of the CIE values include: color values X, Y, and Z defined in a CIE1976-XYZ colorimetric system (which will be referred to simply as an XYZ color system); and color values L, a, and b defined in a CIE1976-L*a*b* colorimetric system (which will be referred to simply as an Lab color system).

As shown in FIG. 1, the network is provided with a plurality of color conversion devices for converting device color values, representative of colors defined in the respective image processing devices, into the CIE values and for reconverting the CIE values into the device color values.

Each color conversion device has a color conversion characteristic which is called profile data. That is, the color conversion device converts the device color values into the CIE values according to the profile data. The color conversion device also reconverts the CIE values into the device color values also according to the profile data.

For example, the device color values for a printer is constructed from control signal values C, M, Y, and K, which are defined in a CMYK color system to represent tone levels of cyan, magenta, yellow, and black to be printed. The color conversion device connected to the printer therefore stores profile data for converting the control signal values C, M, Y, and K into CIE values and for reconverting the CIE values into the control signal values C, M, Y, and K. The device color values for a CRT display is constructed from color signal values R, G, and B which are defined in a RGB color system to represent intensities of red, green, and blue light emitting devices mounted in the CRT display. The color conversion device connected to the CRT display stores profile data for converting the color signal values R, G, and B into CIE values and for reconverting the CIE values into the color signal values R, G, and B.

When a user produces color signals R, G, and B on the CRT and desires to print the color signals with the printer, the user controls the color conversion device for the CRT to convert the color signals R, G, and B into CIE values. The CIE values are then transmitted to the color conversion device for the printer. The color conversion device reconverts the received CIE values into control signals C, M, Y, and K.

SUMMARY OF THE INVENTION

FIG. 2 shows one conceivable color conversion network provided between a CRT 104 and a printer 100.

In this example, the color conversion device is provided internally of the printer 100. That is, the printer 100 includes: a CPU 110; a read only memory (ROM) 112; a random access memory (RAM) 114; and a print head 116. The CPU 110 is connected to the RAM 114 so that the CPU 110 can rewrite memory contents in the RAM 114. The CPU 110 includes a first color conversion portion 120 and a second color conversion portion 122. The ROM 112 stores profile data [1] of the printer 100.

The printer 100 is connected to the CRT 104 via an external CPU 102 which is provided in an external device such as a personal computer. The external CPU 102 is connected to a key board 101 (input device) and a hard disk 106 (memory device). A mouse may also be connected to the external CPU 102 as another input device. The hard disk 106 stores profile data [2] of the CRT 104. The external CPU 102 can rewrite data in the hard disk 106. The external CPU 102 is for controlling the CRT 104 to display images and for transmitting color data to the printer 100.

The first color conversion portion 120 in the printer 100 is for receiving the color data transmitted from the external CPU 102 and for retrieving data stored in the RAM 114. The first color conversion portion 120 is for converting the received color data into intermediate data according to the data stored in the RAM 114. The first color conversion portion 120 outputs the intermediate data to the second color conversion portion 122.

The second color conversion portion 122 is for receiving the intermediate data outputted from the first color conversion portion 120 and for retrieving the profile data [1] from the ROM 112. The second color conversion portion 122 is for converting the intermediate data into control data in accordance with the profile data [1]. The second color conversion portion 122 outputs the control data to the print head 116.

With the above-described structure, the external CPU 102 operates as described below.

A user first manipulates the key board 101 and the mouse (not shown) to instruct the external CPU 102 to produce his/her desired image. According to this instruction, the external CPU 102 controls the CRT 104 to display the image.

Observing the image displayed on the CRT 104, the user confirms whether or not his/her desired image is properly produced. When the user's desired image is properly produced, the user depresses a print execution key on the key board 101 in order to obtain a print sample of the image. In response to the print execution instruction, the external CPU 102 supplies the printer 100 with the profile data [2] of the CRT 104, which is stored in the hard disk 106. The external CPU 102 also supplies the printer 100 with color data (PR, PG, PB). The color data (PR, PG, PB) is comprised of tone signals (stimulus values) PR, PG, and PB which are defined in the RGB system to control the CRT 104 to display the user's desired image according to a color additive mixing method. It is noted that a tone level of each signal PR, PG, and PB is between zero (0) and 255. That is, $0 \leq PR, PG, PB \leq 255$.

Next, the printer 100 performs a color conversion operation as described below.

As shown in the flow chart of FIG. 3, when the color conversion process starts, the printer 100 receives the profile data [2] from the external CPU 102 in S100. The printer 100 then stores the received profile data [2] in a predetermined region of the RAM 114 in S101. When the profile data [2] is completely stored in the RAM 114, the printer 100 starts receiving in S102 the color data comprised of a plurality of sets of three stimulus values (PR, PG, PB). Each value set (PR, PG, PB) is defined in the RGB colorimetric system. The plurality of sets of values (PR, PG, PB) are defined to produce a plurality of picture elements of the users's desired image. Then, when one set of values (PR, PG, PB) is received in S102, the program proceeds to S103 where the first color conversion portion 120 retrieves the profile data [2] from the RAM 114, and converts the set of values (PR, PG, PB) into a set of three stimulus values (PX, PY, PZ) which is defined in the XYZ colorimetric system. The conversion manner will be described later.

Then, the thus obtained set of three stimulus values (PX, PY, PZ) is further converted into a set of signals (PL, Pa, Pb) in S104. The value set (PL, Pa, Pb) is defined according to three dimensional orthogonal coordinates in the Lab colorimetric system.

It is noted that a set of values (X, Y, Z) in the XYZ color system can be converted into a set of values (L, a, b) in the Lab color system through the following formulas (1):

$$L=(Y/Yn)^{1/3}*116-16$$

$$a=500*((X/Xn)^{1/3}-(Y/Yn)^{1/3})$$

$$b=200*((Y/Yn)^{1/3}-(Z/Zn)^{1/3}) \quad \ldots (1)$$

where * indicates a multiplication, and Xn, Yn, and Zn are X, Y, and Z components of a values set (Xn, Yn, Zn) defined to indicate a normal white color.

The profile data [2] includes the value set (Xn, Yn, and Zn). In S104, therefore, the values X, Y, and Z in the formulas (1) are substituted by the values PX, PY, and PZ. The formulas (1) are calculated to obtain the values L, a, and b. The thus obtained values L, a, and b are determined as the values PL, Pa, and Pb. Thus, the set of values (PL, Pa, Pb) is obtained as first intermediate data.

Next, in S105, the second color conversion portion 122 converts the value set (PL, Pa, Pb) into a set of control signals (PC, PM, PY, PK) based on the profile data [1] stored in the ROM 112. The signals PC, PM, PY, PK are control signals (second intermediate data) defined in the CMYK colorimetric system for controlling the print head 116 to print cyan, magenta, yellow, and black, respectively. Thus obtained set of control signals (PC, PM, PY, PK) will control the print head 116 to print a corresponding picture element with a color indicated by the original set of color data (PR, PG, PB).

Then, it is judged in S106 whether or not the reception of the color data is completed. When the color data reception is completed, the process ends in S107. On the other hand, when the color data reception is not yet completed, the program returns to S102. Thus, the color data, i.e., the plurality of sets of tone signals (PR, PG, PB) are converted set one by one to the control signal sets (PC, PM, PY, PK) through the repeatedly-performed steps S102–S106.

Next will be given a detailed description of the conversion manner employed in S103 to convert the original signal set (PR, PG, PB) into the signal set (PX, PY, PZ).

First, the structure of the profile data [2] will be described.

The profile data [2] includes: values (coefficients) γr, γg, and γb for the three primary colors, red, green, and blue displayed on the CRT 104; and three value sets (Xr, Yr, Zr), (Xg, Yg, Zg), and (Xb, Yb, Zb) indicative of the three primary colors displayed on the CRT 104.

The coefficient γr represents the relationship between a red tone signal R and a brightness of red light actually emitted from the CRT 104 when the CRT is controlled by the red tone signal R. The coefficient γg represents the relationship between a green tone signal G and a brightness of green light actually emitted from the CRT 104 when the CRT is controlled by the green tone signal G. The coefficient γb represents the relationship between a blue tone signal B and a brightness of blue light actually emitted from the CRT 104 when the CRT is controlled by the blue tone signal B.

The signal set (Xr, Yr, Zr) is defined in the XYZ color system for indicating a red color R. The signal set (Xg, Yg, Zg) is defined in the XYZ color system for indicating a green color G. The signal set (Xb, Yb, Zb) is defined in the XYZ color system for indicating a blue color B.

With using the profile data [2], that is, with using the values γr, γg, γb, Xr, Yr, Zr, Xg, Yg, Zg, Xb, Yb, and Zb, any color represented by a signal set (R, G, B) in the RGB color system can be converted into another signal set (X, Y, Z) in the XYZ color system through the following formulas (2):

$$X=SR*Xr+SG*Xg+SB*Xb$$

$$Y=SR*Yr+SG*Yg+SB*Yb$$

$$Z=SR*Zr+SG*Zg+SB*Zb$$

where $$SR=(R/255)^{\gamma r}, \ SG=(G/255)^{\gamma g}, \text{ and } SB=(B/255)^{\gamma b} \quad \ldots (2)$$

It is noted that the coefficients γr, γg, and γb are used in the formulas (2) as power numbers. SR, SG, and SB are indicative of brightness amounts of the three primary color components of light actually emitted from the CRT 104 when the CRT is controlled by the color signal set (R, G, B).

Accordingly, in S103, the values R, G, and B in the formulas (2) are substituted by the values PR, PG, and PB of the original signal set (PR, PG, PB). The formulas (2) are calculated to obtain the values X, Y, and Z. The obtained values X, Y, Z are used as the values PX, PY, and PZ.

Next, will be given a detailed description of the conversion manner employed in S105 for converting the signal set (PL, Pa, Pb) obtained in S104 into the print control signal set (PC, PM, PY, PK).

First, the details of the structure of the profile data [1] will be described.

A signal set (L, a, b) is defined in a Lab color space W as shown in FIG. 4. The Lab color space W is defined by a coordinate system made by three axes L, a, and b. The Lab color space W is divided into a lattice with uniform intervals along the L, a, and b axial directions. The lattice therefore has many cubes J which are arranged uniformly in the L, a, and b axial directions. Each cube J is defined by eight lattice points A, B, C, D, E, F, G, and H. A set of control signals (WC, WM, WY, WK) is previously calculated for a set of color data (L, a, b) which represents each of the eight lattice points. The set of control signals (WC, WM, WY, WK) is calculated so as to reproduce the same color as indicated by the corresponding set of color data (L, a, b). The calculation is performed for the eight lattice points of all the cubes J in the space W. Thus obtained plurality of sets of control signals (WC, WM, WY, WK) are stored as the profile data [1] in correspondence with the lattice points (L, a, b) of all the cubes J throughout the space W.

It is now assumed that one set of color data (L, a, b) represents a color point P shown in FIG. 4. The color point P resides in a specific cube J. The cube J is defined by eight lattice points A, B, C, D, E, F, G, and H which surround the color point P. Eight sets of control signal values (WC, WM, WY, WK) are stored in the profile data [1] in correspondence with the sets of values (L, a, b) for the eight lattice points A to H. The eight sets of control signal values (WC, WM, WY, WK) will be respectively referred to as (Ac, Am, Ay, Ak), (Bc, Bm, By, Bk), (Cc, Cm, Cy, Ck), (Dc, Dm, Dy, Dk), (Ec, Em, Ey, Ek), (Fc, Fm, Fy, Fk), (Gc, Gm, Gy, Gk), and (Hc, Hm, Hy, Hk). The sets of values (L, a, b) for the lattice points A through H will be referred to as (AL, Aa, Ab) through (HL, Ha, Hb), respectively.

In this circumstance, a control signal set (C, M, Y, K) can be obtained for the color data set (L, a, b) through an interpolation calculation as defined in the following formulas (3):

$$C = KA*Ac+KB*Bc+KC*Cc+KD*Dc+KE*Ec+KF*Fc+KG*Gc+KH*Hc$$

$$M = KA*Am+KB*Bm+KC*Cm+KD*Dm+KE*Em+KF*Fm+KG*Gm+KH*Hm$$

$$Y = KA*Ay+KB*By+KC*Cy+KD*Dy+KE*Ey+KF*Fy+KG*Gy+KH*Hy$$

$$K = KA*Ak+KB*Bk+KC*Ck+KD*Dk+KE*Ek+KF*Fk+KG*Gk+KH*Hk \quad \ldots (3)$$

where * indicates a multiplication, and the weight coefficients KA, KB, KC, KD, KE, KF, KG, and KH are defined in the following formulas (4):

$$KA=(TL-SL)*(Ta-Sa)*(Tb-Sb)/(TL*Ta*Tb)$$

$$KB=(TL-SL)*(Ta-Sa)*Sb/(TL*Ta*Tb)$$

$$KC=(TL-SL)*Sa*(Tb-Sb)/(TL*Ta*Tb)$$

$$KD=(TL-SL)*Sa*Sb/(TL*Ta*Tb)$$

$$KE=SL*(Ta-Sa)*(Tb-Sb)/(TL*Ta*Tb)$$

$$KF=SL*(Ta-Sa)*Sb/(TL*Ta*Tb)$$

$$KG=SL*Sa*(Tb-Sb)/(TL*Ta*Tb)$$

$$KH=SL*Sa*Sb/(TL*Ta*Tb) \quad \ldots (4)$$

where TL, Ta, Tb, SL, Sa, and Sb represent distances defined below as shown in FIG. 5.

$$TL=HL-AL,$$

$$Ta=Ha-Aa,$$

$$Tb=Hb-Ab,$$

$$SL=L-AL,$$

$$Sa=a-Aa,$$

and $$Sb=b-Ab. \quad \ldots (5)$$

The values TL, Ta, and Tb are the distances between the lattice points (vertex points) of the cube J along the L, a, and b axial directions, and the values SL, Sa, and Sb are the distances between the color point P and the main surfaces of the cube J in the L, a, and b axial directions.

Accordingly, in S105, the second color conversion portion 122 searches eight lattice points A to H that surround the inputted value set (PL, Pa, Pb). The portion 122 retrieves, from the profile data [1], eight sets of control signal values (WC, WM, WY, WK) for the eight lattice points A to H. The portion then substitutes the values L, a, and b in the formulas (5) with the values PL, Pa, and Pb of the inputted data set (PL, Pa, Pb). Then, the formulas (5), (4), and (3) are calculated to obtain the values C, M, Y, and K. Thus obtained values C, M, Y, K are outputted as the values PC, PM, PY, and PK.

Thus, the value set (PL, Pa, Pb) is converted into the control signal set (PC, PM, PY, PK) in S105.

The above-described color conversion operation can be performed for any types of image processing devices so that they can always reproduce accurate colors. It is unnecessary to consider the color reproduction characteristics of the respective devices such as the CRT, the printer, and the like.

It is noted, however, that the above-described color conversion operation performs very complicated calculations. The CPU in the printer has to calculate an enormous amount of values. That is, the CPU performs the above-described calculations S103–S105 repeatedly for all the picture elements. Because each image is comprised of a great number of picture elements, a quite long time is required to complete the color conversion for the entire image.

In order to reduce the time length, one method can be proposed to employ a CPU of an enhanced processing ability. This method, however, will lead to increase in costs of the CPU. The entire printer will become expensive.

It is therefore, an object of the present invention to overcome the above-described drawbacks, and to provide an improved color conversion device.

In order to attain the above and other objects, according to the present invention, the complex color conversion process is simplified. The color conversion process of the present invention can therefore perform a color conversion operation on an entire image within a much shorter time period.

That is, the present invention provides a color conversion device, comprising: first color conversion means capable of converting input signals into first intermediate signals; second conversion means capable of converting the first intermediate signals into second intermediate signals; first conversion characteristic memory means for storing a first conversion characteristic of the first color conversion means; second conversion characteristic memory means for storing a second conversion characteristic of the second color conversion means; signal generation means for generating representative signals of an input range within which input signals spread; third conversion characteristic memory means for storing, as a third conversion characteristic, second intermediate representative signals which are obtained though converting the representative signals by the first conversion means and the second conversion means; and third color conversion means for converting the input signals with the third conversion characteristic stored in the third conversion characteristic memory means and for outputting the obtained signals as output signals.

According to another aspect, the present invention provides a method of converting colors, the method comprising the steps of: receiving input signals which spread in an input range; generating representative signals within the input range of the input signals; converting the representative signals into first intermediate representative signals with a first conversion characteristic; converting the first intermediate representative signals into second intermediate representative signals with a second conversion characteristic; and converting the input signals into output signals with using the second intermediate representative signals.

According to still another aspect, the present invention provides a color conversion method for converting colors, the method comprising the steps of: receiving input signals which spread within an input range; comparing an amount of the input signals with an amount of representative signals to be produced during a second color conversion process; selecting one of a first conversion process and the second conversion process based on the compared result; and performing a first conversion process when the first conversion process is selected and performing a second conversion process when the second conversion process is selected.

The first conversion process includes the steps of: converting the input signals into first intermediate input signals with a first conversion characteristic; and converting the first intermediate input signals into second intermediate input signals with a second conversion characteristic, thereby outputting the second intermediate input signals as output signals.

The second conversion process includes the steps of: generating representative signals of the input range; converting the representative signals into first intermediate representative signals with the first conversion characteristic; converting the first intermediate representative signals into second intermediate representative signals with the second conversion characteristic; and converting the input signals into the output signals with using the second intermediate representative signals.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
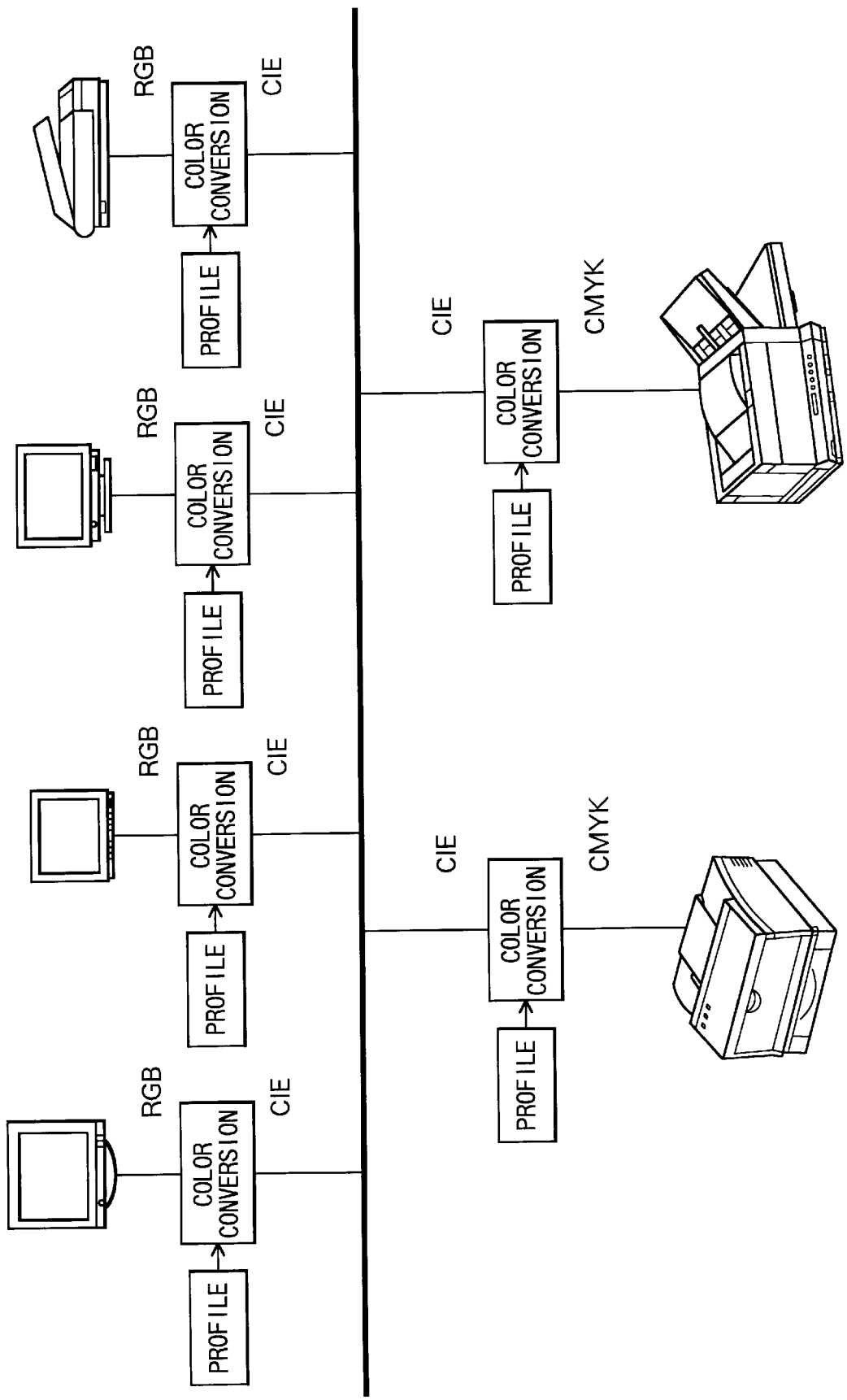
FIG. 1 schematically illustrates a Device-Independent-Color system.

A color conversion device according to preferred embodiments of the present invention will be described while referring to the accompanying drawings wherein like parts and components are designated by the same reference numerals to avoid duplicating description.

A first embodiment of the present invention will be described below with reference to FIGS. 6 through 9.

Figure 6:
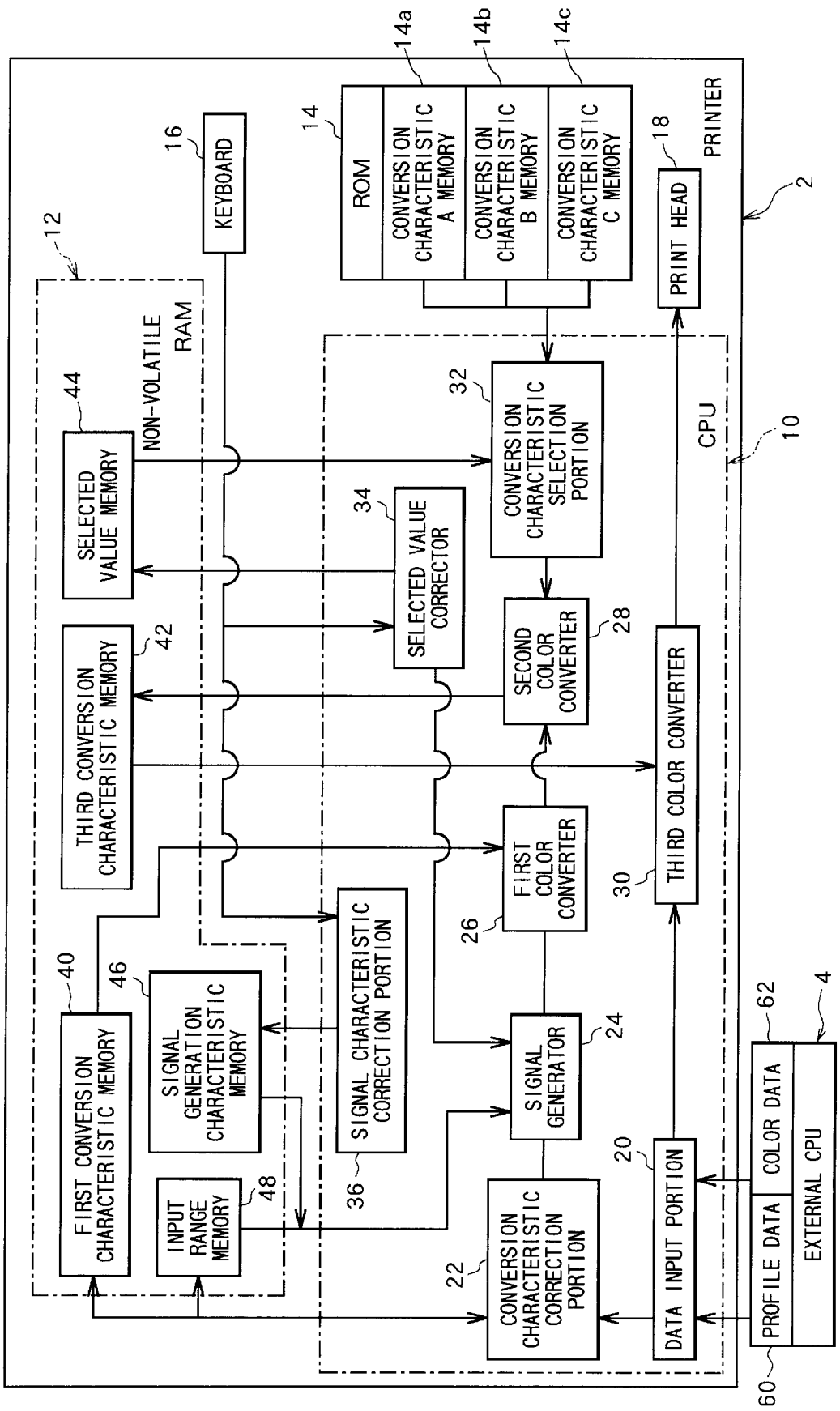
FIG. 6 is a functional block diagram of a structure of a printer 2 according to a first embodiment of the present invention.

FIG. 6 is a functional block diagram of a printer 2 to which is applied a color conversion device of the present embodiment. The printer 2 is connected to an external CPU 4 which is provided in an external device such as a personal computer. Data can be transmitted between the printer 2 and the external CPU 4. The printer 2 includes: a CPU 10; a non-volatile RAM 12; a ROM 14; a key board 16; and a print head 18.

The CPU 10 includes: a data input portion 20; a conversion characteristic correction portion 22; a selected value correction portion 34; a signal generator 24; a first color conversion portion 26; a second color conversion portion 28; a third color conversion portion 30; a conversion characteristic selection portion 32; and a signal characteristic correction portion 36.

The non-volatile RAM 12 includes: a first conversion characteristic memory 40; a third conversion characteristic memory 42; a selected value memory 44; a signal generating characteristic memory 46; and an input range memory 48.

The ROM 14 includes: a color conversion characteristic A memory 14a; a color conversion characteristic B memory 14b; and a color conversion characteristic C memory 14c. The memory 14a stores therein profile data indicative of a color conversion characteristic A, the memory 14b stores therein profile data indicative of another color conversion characteristic B, and the memory 14c stores therein profile data indicative of still another color conversion characteristic C.

The external CPU 4 can output image data comprised of color data 62 and profile data 60 of the color data 62. The color data 62 represents a color image produced by the personal computer or the like. The color data 62 is comprised of a plurality of sets of color signals (PR, PG, PB) representative of a plurality of picture elements of an image. The color signals (PR, PG, PB) are defined in the RGB color system.

The data input portion 20 is constructed from a buffer memory. The data input portion 20 is connected to the external CPU 4 so that the data input portion 20 can receive color data 62 and profile data 60 from the external CPU 4. The data input portion 20 is also connected both to the conversion characteristic correction portion 22 and to the third color conversion portion 30. The data input portion 20 outputs the profile data 60 to the conversion characteristic correction portion 22. The data input portion 20 outputs the color data 62 to the third color conversion portion 30.

The conversion characteristic correction portion 22 is connected to the first conversion characteristic memory 40, the input range memory 48, and the signal generator 24. Upon receiving the profile data 60 from the data input portion 20, the conversion characteristic correction portion 22 retrieves data from the memories 40 and 48 and compares the profile data 60 with the retrieved data. When the profile data 60 is not consistent with the retrieved data, the correction portion 20 replaces the data in the memories 40 and 48 with the profile data 60. As will be described later, the conversion characteristic correction portion 22 is also for instructing the signal generator 24 to start generating several sets of color signals (Rout_i, Gout_j, Bout_k) which are defined in the RGB color system.

The signal generator 24 is connected to the conversion characteristic correction portion 22, the selected value correction portion 34, the signal generating characteristic memory 46, the input range memory 48, and the first color conversion portion 26. The signal generator 24 can receive signal generating instructions from both the conversion characteristic correction portion 22 and the selected value correction portion 34. When instructed by the portion 20 or 34, the signal generator 24 retrieves data from the signal generating characteristic memory 46 and the input range memory 48. Based on the retrieved data, the signal generator 24 generates, set one by one, several sets of color signals (Rout__i, Gout__j, Bout__k), and outputs the color signal sets to the first color conversion portion 26.

The first color conversion portion 26 is connected to the signal generator 24, the first conversion characteristic memory 40, and the second color conversion portion 28. The first color conversion portion 26 serves to receive the several sets of color signals (Rout__i, Gout__j, Bout__k), set one by one, from the signal generator 24. The portion 26 retrieves data from the first conversion characteristic memory 40. Based on the retrieved data, the portion 26 serves to convert the several sets of color signal sets (Rout i, Gout__J, Bout__k) into several sets of first intermediate signals (QL, Qa, Qb) which are defined in the Lab color system. The portion 26 supplies the several sets of first intermediate signals (QL, Qa, Qb), set one by one, to the second color conversion portion 28.

The conversion characteristic selection portion 32 is connected to the selected value memory 44, the color conversion characteristic A memory 14a, the color conversion characteristic B memory 14b, the color conversion characteristic C memory 14c, and the second color conversion portion 28. According to a user's selected value stored in the memory 44, the conversion characteristic selection portion 32 retrieves data from one of the memories 14a, 14b, and 14c.

The second color conversion portion 28 is connected to the first color conversion portion 26, the conversion characteristic selection portion 32, and the third conversion characteristic memory 42. The portion 28 serves to receive the several sets of first intermediate signals (QL, Qa, Qb), set one by one. The portion 28 retrieves data from the conversion characteristic selection portion 32. Based on the retrieve data, the portion 28 serves to convert the several sets of first intermediate signal sets (QL, Qa, Qb) into several sets of second intermediate signals (QC, QM, QY, QK) which are defined in the CMYK color system. The portion 28 replaces data already stored in the third conversion characteristic memory 42 with the thus newly-obtained several sets of second intermediate signals (QC, QM, QY, QK).

The selected value correction portion 34 is connected to the key board 16, the selected value memory 44, and the signal generator 24. Upon receipt of the user's newly selected value from the key board 16, the selected value correction portion 34 rewrites the user's selected value stored in the memory 44, and instructs the signal generator 24 to start generating the color signals (Rout__i, Gout__j, Bout__k).

The signal characteristic correction portion 36 is connected to the key board 16 and the signal generating characteristic memory 46. Upon receipt of the user's newly inputted number "STEP" from the key board 16, the correction portion 36 replaces data stored in the memory 46 with the newly inputted number "STEP."

The third color conversion portion 30 is connected to the data input portion 20, the third conversion characteristic memory 42, and the print head 18. Upon receipt of the color data, i.e., the plurality of sets of color tone signals (PR, PG, PB) from the data input portion 20, the color conversion portion 30 retrieves the second intermediate signals (QC, QM, QY, QK) from the third conversion characteristic memory 42. The color conversion portion 30 performs an interpolation calculation on the second intermediate signals (QC, QM, QY, QK) to thereby convert the plurality of color data sets (PR, PG, PB) into a plurality of sets of control signals (PC, PM, PY, PK). The color conversion portion 30 outputs the control signal sets (PC, PM, PY, PK) to the print head 18.

In the present embodiment, the color data 62 includes the plurality of sets of color tone signals (PR, PG, PB) indicative of the plurality of picture elements of a color image. The tone signals PR, PG, and PB are defined in the RGB color system to represent tone levels of the three primary color components R, G, and B in the range of 0 to 255. The print head 18 is designed to be controlled by the plurality of sets of control signals (PC, PM, PY, PK), which are defined in the CMYK color system and which are outputted from the third color conversion portion 30, thereby printing the corresponding color image on a recording paper (not shown).

With the above-described structure, the printer 2 performs a color conversion process as described below.

Figure 7:
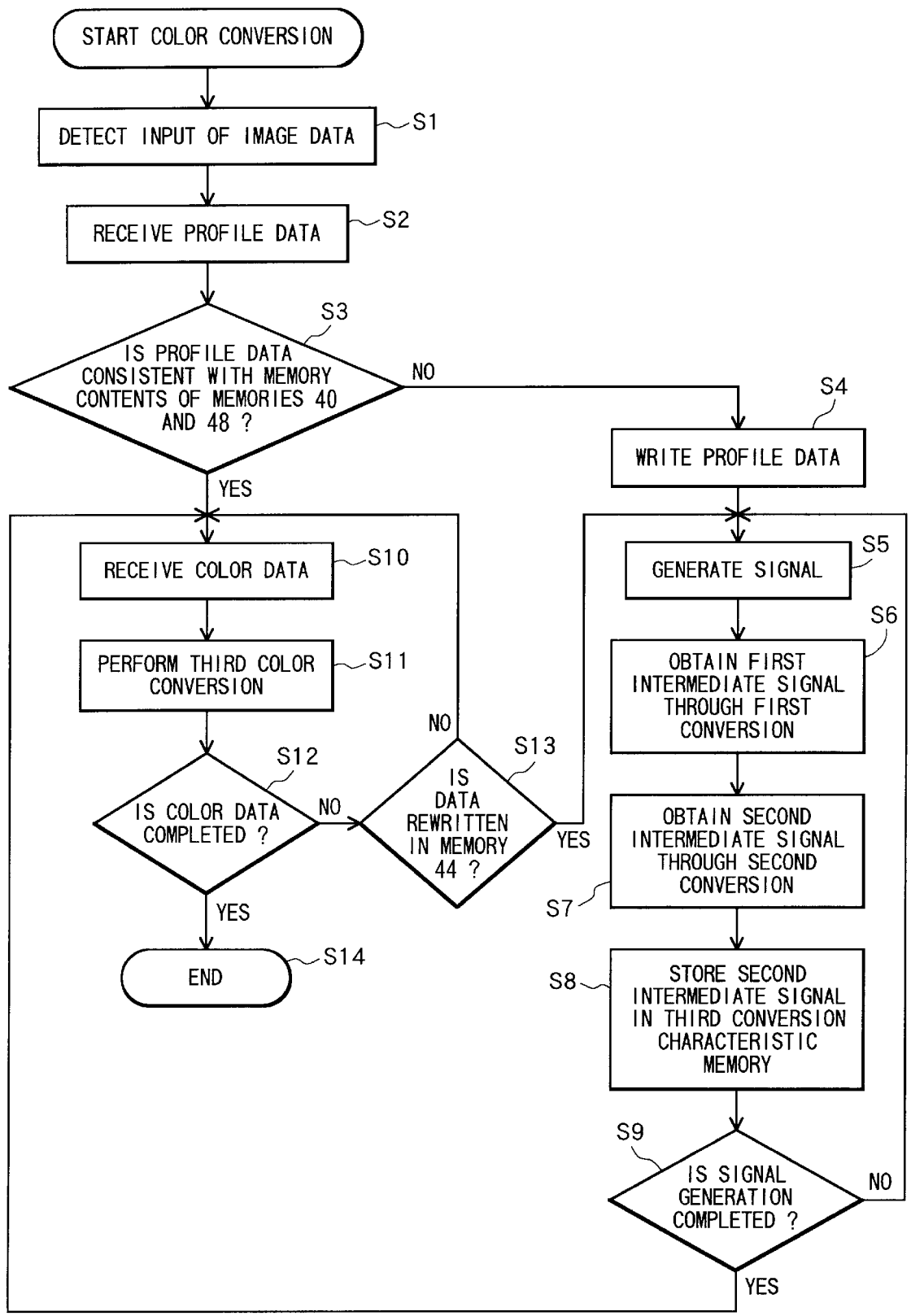
FIG. 7 is a flow chart illustrating the processings attained by the first embodiment of FIG. 6.

When the user depresses a print execution key (not shown) on the key board 16, a color conversion process starts as shown in FIG. 7. When the CPU 10 in the printer 2 detects input of image data in S1, the data input portion 20 requests the external CPU 4 to output the profile data 60. In S2, the data input portion 20 receives the profile data 60 transmitted from the external CPU 4.

Then, in S3, the conversion characteristic correction portion 22 judges whether or not the received profile data 60 is consistent with the contents of the first conversion characteristic memory 40 and of the input range memory 48. If the profile data 60 is not consistent with the memory contents (no in S3), the conversion characteristic correction portion 22 replaces the contents of the memories 40 and 48 with data contents of the profile data 60 in S4. The conversion characteristic correction portion 22 then instructs the signal generator 24 to successively generate several sets of color signals (Rout__i, Gout__j, Bout__k). In S5, the signal generator 24 starts generating the color signal sets (Rout__i, Gout__j, Bout__k), set one by one, in accordance with data contents presently stored in the memory 48 and with data stored in the signal generating characteristic memory 46.

Then, when the first color conversion portion 26 receives one set of color signals (Rout__i, Gout__j, Bout__k) from the signal generator 24 in S5, the portion 26 converts, in S6, the received signal set into a set of first intermediate signals (QL, Qa, Qb) in accordance with the contents now, stored in the first conversion characteristic memory 40.

Next, in S7, the second color conversion portion 28 receives the set of first intermediate signals (QL, Qa, Qb). The portion 28 converts the set of first intermediate signals (QL, Qa, Qb) into a set of second intermediate signals (QC, QM, QY, QK). The second color conversion portion 28 performs this second color conversion operation based on either one of the color conversion characteristics A through C that is selected by the conversion characteristic selection portion 32. This selection operation will be described later.

In S8, the thus produced set of second intermediate signals (QC, QM, QY, QK) is stored, as third conversion characteristic values, in the third conversion characteristic memory 42 at its predetermined area. Thus, the set of second intermediate signals (QC, QM, QY, QK) is stored in the third conversion characteristic memory 42 in correspondence with the color signal set (Rout_i, Gout_j, Bout_k).

Next, in S9, it is judged whether or not the signal generator 24 still continues generating the several sets of color signals (Rout_i, Gout_j, Bout_k). When the signal generator 24 does not yet complete generating the color signals sets (no in S9), the program returns to S5, and the steps S5 through S9 are repeated. Through the repeated operations, several sets of second intermediate signal sets (QC, QM, QY, QK) are successively produced for the several sets of color signal sets (Rout_i, Gout_j, Bout_k). The several sets of second intermediate signals (QC, QM, QY, QK) are stored in the memory 42 in correspondence with the several sets of color signal sets (Rout_i, Gout_j, Bout k). Thus, the contents of the third conversion characteristic memory 42 are created.

On the other hand, when the signal generation is completed at the signal generator 24 (yes in S9), the data input portion 20 starts in S10 retrieving the color data 62. That is, the portion 20 starts retrieving, set one by one, the plurality of tone signal sets (PR, PG, PB) of the color data 62. When the portion 20 retrieves one set of tone signals (PR, PG, PB), the program proceeds to S11.

In S11, the third color conversion portion 30 converts the retrieved tone signal set (PR, PG, PB) into a control signal set (PC, PM, PY, PK). The control signal set (PC, PM, PY, PK) is for controlling the print head 18 to print the same color as represented by the tone signal set (PR, PG, PB). The third color conversion portion 30 performs this conversion operation through interpolating the sets of second intermediate signals (QC, QM, QY, QK) now stored in the third conversion characteristic memory 42. Then, in S12, it is judged whether or not the retrieval of the color data 62 is completed. When the input of the color data 62 continues (no in S12), the program proceeds to S13 where it is judged whether or not the portion 34 newly rewrites data in the memory 44. If not (no in S13), the program returns to S10, and the processes of S10 through S13 are repeated. Accordingly, the plurality of sets of tone signals (PR, PG, PB) are converted, set one by one, into a plurality sets of control signals (PC, PM, PY, PK). When the retrieval is completed (yes in S12), the program ends in S14. Thus, the tone signal sets (PR, PG, PB) of all the picture elements are converted into control signal sets (PC, PM, PY, PK). When receiving the control signal sets (PC, PM, PY, PK), the print head 18 will print all the picture elements in colors the same as represented by the tone signal sets (PR, PG, PB).

On the other hand, when the portion 34 newly rewrites data in the memory 44 (yes in S13), the program proceeds back to S5 where the portion 34 instructs the signal generator 24 to again start generating color signals (Rout i, Gout j, Bout k) Then, the same processes as those of S5 through S9 are repeated, thereby correcting the memory contents in the third conversion characteristic memory 42. Afterwardly, the color data 62 is converted into control signals through S10 through S12.

On the other hand, when the profile data 60 is consistent with the contents of the memories 40 and 48 (yes in S3), the program directly proceeds to S10. That is, the steps S4–S9 for creating the third conversion characteristic memory 42 are omitted. The process S3 thus serves to detect a correction state whether the contents of the memories 40 and 48 have to be corrected. The process S9 serves to detect whether the signal generator 24 has completed generating signals.

Though the profile data 60 is compared with the contents of the memories 40 and 48 in the above description, the comparison operation of S3 can be omitted. The program may be designed so that the program directly proceeds from S2 to S4. In other words, the conversion characteristic correction portion 22 may be designed to instruct the signal generator 24 to generate color signals (Rout_i, Gout_j, Bout_k) whenever the conversion characteristic correction portion 22 receives the profile data 60. In this case, the program path from the step S3 to the step S10 can be omitted.

Details of the respective steps will be described below.

First, the structure of the profile data 60 will be described.

The profile data 60 includes: conversion process data used for converting color values R, G, and B, defined in the RGB color system, into X, Y, and Z values defined in the XYZ color system and for converting the values X, Y, and Z into L, a, and b values defined in the Lab color system; and color range data indicative of a color range of the color data 62.

For example, the conversion process data includes values ($\gamma$r, $\gamma$g, $\gamma$b) and matrix coefficients (Xr, Yr, Zr, Xg, Yg, Zg, Xb, Yb, Zb) as described already for the profile data [2] of the conceivable color conversion device. These values are used for converting the color values R, G, and B into values X, Y, and Z in a manner defined by the already-described formulas (2). The conversion process data further includes the values Xn, Yn, and Zn which are used for converting the color values X, Y, and Z into color values L, a, and b in a manner defined by the already-described formulas (1).

The color range data includes: maximum and minimum values Rmax and Rmin of the red primary component amongst all the plurality of sets of tone signals (PR, PG, PB) of the color data 62; maximum and minimum values Gmax and Gmin of the green primary component amongst all the plurality of sets of tone signals (PR, PG, PB) of the color data 62; and maximum and minimum values Bmax and Bmin of the blue primary component amongst all the plurality of sets of tone signals (PR, PG, PB).

The first conversion characteristic memory 40 previously stores certain amounts of values $\gamma$r, $\gamma$g, $\gamma$b, Xr, Yr, Zr, Xg, Yg, Zg, Xb, Yb, Zb, Xn, Yn, and Zn. The input range memory 48 previously stores certain values Rmax, Rmin, Gmax, Gmin, Bmax, and Bmin.

Next, details of the process S3 and the operation of the conversion characteristic correction portion 22 will be described.

When receiving the profile data 60, the conversion characteristic correction portion 22 judges whether or not respective values constituting the profile data 60 are equal to the corresponding values stored in the memories 40 and 48. The conversion characteristic correction portion 22 performs this judgement one by one for all the values in the profile data 60. The conversion characteristic correction portion 22 determines that the profile data 60 is consistent with the contents of the memories 40 and 48 only when all the values in the profile data 60 are equal to the values in the memories. When the portion 22 determines that the profile data 60 is not equal to the contents of the memories 40 and 48, the portion 22 writes the respective values of the profile data 60 to the corresponding regions of the memories 40 and 48 in S4.

Next, details of the process S5 and the operation of the signal generator 24 will be described.

First, the signal generating characteristic memory 46 will be described.

The signal generating characteristic memory 46 stores a number "STEP" for dividing the color range of the color data 62. That is, the number "STEP" is for dividing the color range of the red color component between the maximum value Rmax and the minimum value Rmin, the color range of the green color component between the maximum value Gmax and the minimum value Gmin, and the color range of the blue color component between the maximum value Bmax and the minimum value Bmin.

In this embodiment, the memory 46 stores a single number "STEP." However, the memory 46 may store three numbers STEPr, STEPg, and STEPb for dividing the color ranges of the three color components, respectively.

Additionally, the number STEP may be set as a correctable value. That is, the user can manipulate the key board 16 to input his/her desired number STEP. As shown in FIG. 6, the signal characteristic correction portion 36 may receive the newly-inputted number STEP from the key board 16 and may correct the value STEP in the memory 46 into the newly-inputted value.

In S5, the signal generator 24 is instructed by the conversion characteristic correction portion 22 (or the selected value correction portion 34) to generate a set of color signals (Rout_i, Gout_j, Bout_k) based on information presently stored in the memories 48 and 46 by the following formulas (6):

$$Rout\_i = i*R\_SPACE + Rmin$$

$$Gout\_j = j*G\_SPACE + Gmin$$

$$Bout\_k = k*B\_SPACE + Bmin$$

where $$R\_SPACE = (Rmax - Rmin)/STEP$$

$$G\_SPACE = (Gmax - Gmin)/STEP$$

$$B\_SPACE = (Bmax - Bmin)/STEP \qquad \ldots (6)$$

where i, j, and k are subscripts indicative of an order of the color signal set in the three color components. The numbers i, j, and k are integers between zero (0) and the number STEP. That is, $0 \leq i, j, k \leq STEP$. While the step S5 is repeated due to the S9 judgement, several sets of signals (Rout_i, Gout_j, Bout_k) are calculated through the formulas (6), set one by one, and are supplied to the first color conversion portion 26. The step S5 is repeated by the number "No" of times where No=(STEP+1)*(STEP+1)*(STEP+1). The signal generator 24 therefore generates the "No" sets of color signals (Rout_i, Gout_j, Bout_k) in total.

For example, when the value STEP is eight (8), the signal generator 24 generates 729 (=9*9*9) sets of color signals in total. When the value STEP in the memory 46 is corrected by the correction portion 36 into 16, on the other hand, the signal generator 24 will generate 4913 (=17*17*17) sets of color signals.

Next, the steps S6 and S7 will be described in a great detail.

The operation of S6 is performed when the first color conversion portion 26 receives one set of color signals (Rout i, Gout_j, Bout_k) from the signal generator 24. The portion 26 first converts the set of color signals into a set of values (QX, QY, QZ) according to the conversion process data (γr, γg, γb, Xr, Yr, Zr, Xg, Yg, Zg, Xb, Yb, Zb) presently stored in the first conversion characteristic memory 40.

That is, the first color conversion portion 26 calculates the already-described formula (2) while substituting the values R, G, and B in the formula (2) with the values Rout_i, Gout_j, Bout_k, respectively. The obtained set of values (X, Y, Z) is used as the set of values (QX, QY, QZ).

The first color conversion portion 26 further converts the thus obtained set of values (QX, QY, QZ) into a set of values (QL, Qa, Qb) with the use of the remaining conversion process data Xn, Yn, and Zn now stored in the memory 40. That is, the portion 26 calculates the already-described formulas (1) while substituting the values X, Y, and Z with the values QX, QY, and QZ. The obtained values L, a, and b are used as the values QL, Qa, and Qb.

Thus, the first color conversion portion 26 produces a set of first intermediate signals (QL, Qa, Qb). As apparent from the above, the conversion manner employed by the first color conversion portion 26 is basically the same as that of the processes S103 and S104.

In S7, the second color conversion portion 28 receives the thus obtained set of first intermediate signals (QL, Qa, Qb) from the first color conversion portion 26. The second color conversion portion 28 then converts the set of first intermediate signals (QL, Qa, Qb) into a set of control signals (QC, QM, QY, QK) as a set of second intermediate signals.

The conversion manner employed by the portion 28 will be described below.

Figure 2:
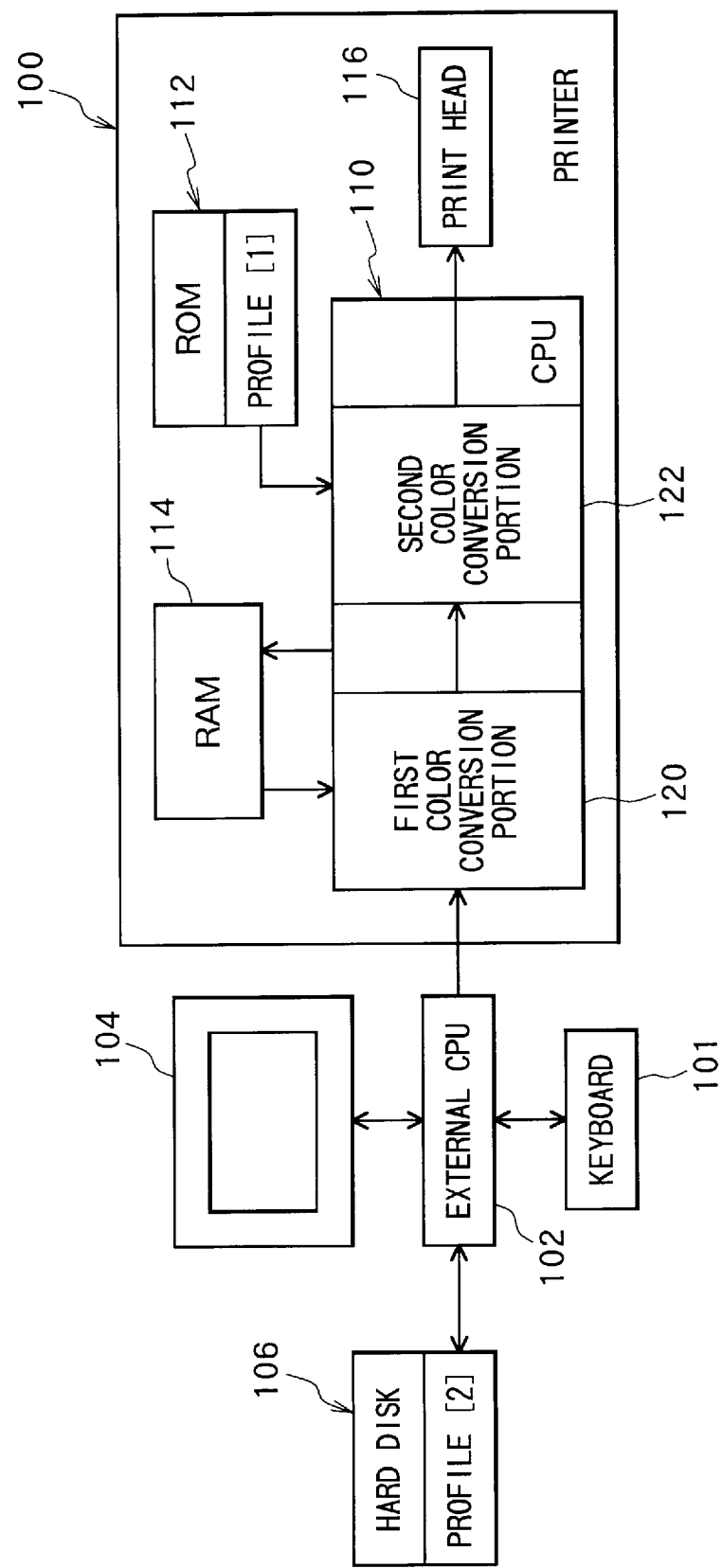
FIG. 2 is a functional block diagram of a conceivable color conversion device.

First, data stored in the ROM 14 will be described. The color conversion characteristic A memory 14a stores conversion characteristic data A (profile data) for converting a set of first intermediate signals (QL, Qa, Qb) into a set of second intermediate signals (QC, QM, QY, QK). In more concrete terms, the memory 14a stores a plurality of sets of control signals (WC, WM, WY, WK) in correspondence with all the lattice points (L, a, b) in the lattice space W shown in FIG. 4. The values (WC, WM, WY, WK) are previously calculated for each lattice point (L, a, b) according to a normal standard so that the values (WC, WM, WY, WK) will properly reproduce the same color as indicated by the values (L, a, b). In other words, the memory 14a stores data corresponding to the profile data [1] described already with reference to FIGS. 2 through 4.

The color conversion characteristic B memory 14b stores conversion characteristic data (profile data) B different from the conversion characteristic data A. That is, the memory 14b stores a plurality of sets of control signals (WC, WM, WY, WK) in correspondence with all the lattice points (L, a, b) in the lattice space W shown in FIG. 4. The values (WC, WM, WY, WK) are previously calculated for each lattice point (L, a, b) according to a standard different from that used for preparing the values stored in the memory 14a.

The color conversion characteristic C memory 14c stores conversion characteristic data (profile data) C different from the conversion characteristic data A and B. That is, the memory 14c stores a plurality of sets of control signals (WC, WM, WY, WK) in correspondence with all the lattice points (L, a, b) in the lattice space W. The values (WC, WM, WY, WK) are previously calculated for each lattice point (L, a, b) according to a standard further different from those used for preparing the values stored in the memories 14a and 14b.

The memories 14a through 14b are thus previously prepared for the reasons described below.

The color conversion characteristic used for converting values (QL, Qa, Qb) into values (QC, QM, QY, QK) should be changed in accordance with a kind of an image represented by the inputted color data 62. For example, it is appreciated that colors on artificially-produced images, such as graphs, charts, and characteristic-extracted images to be used for image analysis, be converted so that users can easily discriminate between those colors. Contrarily, it is preferable that colors on portraits, landscapes, and photographs be converted into colors whose tones change gradually from one to another. The color conversion characteristic B stored in the memory 14b will be used for the artificially-produced images, and the color conversion characteristic C in the memory 14c will be used for the portraits, landscapes, and the like. The color conversion characteristics B and C are therefore prepared through correcting the normal characteristic A while taking into account the above-described demands.

The selected value memory 44 stores a lead address value of either one of the memories 14a, 14b, and 14c that is selected as appropriate for the inputted image data. The memory selection is achieved by the user who manipulates the key board 16 before the conversion operation of FIG. 7 starts.

Immediately before performing the conversion operation of S7, the second color conversion portion 28 instructs the conversion characteristic selection portion 32 to output the color conversion characteristic values (WC, WM, WY, WK) of the user's selected memory 14a, 14b, or 14c. As a result, the conversion characteristic selection portion 32 refers to the lead address value stored in the memory 44. The conversion characteristic selection portion 32 then retrieves all the control signal sets (WC, WM, WY, WK) from the memory (14a, 14b, or 14c) that is located at that lead address. The portion 32 supplies those control signal sets (WC, WM, WY, WK) to the second color conversion portion 28.

With using the thus supplied control signal sets (WC, WM, WY, WK), the second color conversion portion 28 converts the inputted set of first intermediate signals (QL, Qa, Qb) into a set of second intermediate signals (QC, QM, QY, QK) in a manner the same as that employed in S105.

Figure 5:
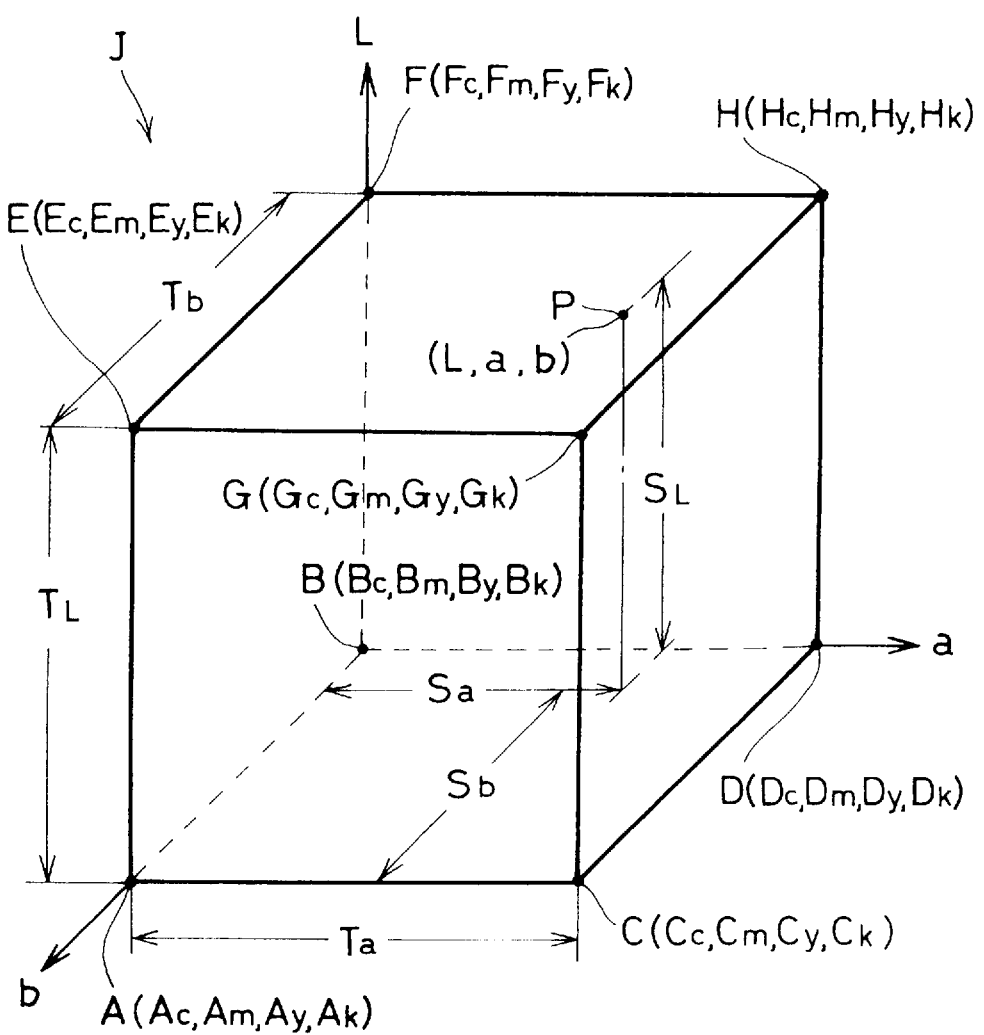
FIG. 5 illustrates an interpolation method employed for converting the values L, a, and b into values C, M, Y, and K in the second color conversion portion of the conceivable device.

In more concrete terms, the portion 28 first searches eight lattice points A, B, C, D, E, F, G, and H that surround a point P indicated by the inputted set of first intermediate signals (QL, Qa, Qb) as shown in FIG. 5. Then, interpolation calculation is performed onto eight sets of control signal values (Ac, Am, Ay, Ak), (Bc, Bm, By, Bk), (Cc, Cm, Cy, Ck), (Dc, Dm, Dy, Dk), (Ec, Em, Ey, Ek), (Fc, Fm, Fy, Fk), (Gc, Gm, Gy, Gk), and (Hc, Hm, Hy, Hk) for the eight lattice points.

That is, the values L, a, and b in the formulas (5) are substituted with the values QL, Qa, and Qb, and the formulas (5), (4) and (3) are calculated. An obtained set of (C, M, Y, K) is used as the value set (QC, QM, QY, QK).

Thus, the set of second intermediate signals (QC, QM, QY, QK) is produced in S7 for the set of color signal (Rout i, Gout_j, Bout_k). The second intermediate signals (QC, QM, QY, QK) can control the print head 18 to reproduce the color indicated by the color signal (Rout_i, Gout_j, Bout k) in a manner selected by the memory 44 as appropriate for the inputted image data.

In S8, the second color conversion portion 28 then stores the calculated set of second intermediate signals (QC, QM, QY, QK) into the predetermined area of the third conversion characteristic memory 42.

S5 through S8 are repeatedly performed, so that the "No" number of sets of color signals (Rout_i, Gout_j, Bout k) are produced, and the "No" number of sets of second intermediate signals (QC, QM, QY, QK) are produced. Each set of second intermediate signals (QC, QM, QY, QK) is stored in the memory 42 together with the corresponding set of color signals (Rout_i, Gout_j, Bout_k).

Thus created contents of the memory 42 will be described below.

Figure 8:
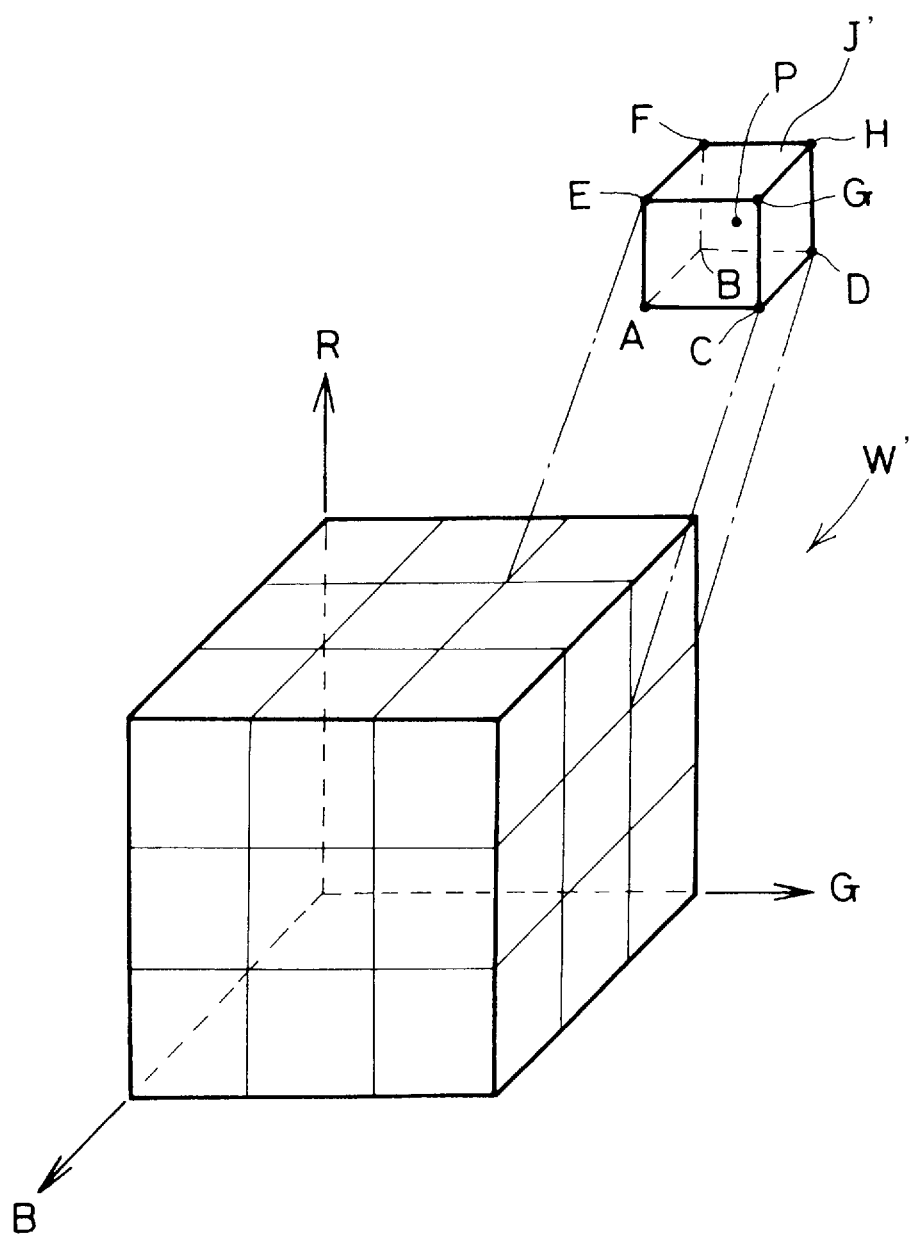
FIG. 8 illustrates an operation of a third color conversion portion of the first embodiment.

An RGB color space W' is defined as shown in FIG. 8. Three axes R, G, and B extend perpendicularly to one another. Along with the three axes R, G, and B, three primary color components PR, PG, and PB of the plurality of tone signals (PR, PG, PB) of the color data 62 are distributed. The RGB color space W' is defined to spread only in a range defined between Rmin and Rmax along the axis R, between Gmin and Gmax along the axis G, and between Bmin and Bmax along the axis B. The RGB color space W' is divided by the number "STEP" along each of the axes R, G, and B. The RGB color space W' is therefore divided into a lattice comprised of a plurality of small cubes J'. The total number of the lattice points that define those cubes J' is equal to "No" where No=(STEP+1)*(STEP+1)* (STEP+1).

Each of the "No" number of sets of color signals (Rout_i, Gout_j, Bout_k), produced by the signal generator 24, is located on a corresponding one of all the lattice points of the RGB color space W'. The first color conversion portion 26 serves to convert the "No" number of sets of color signals (Rout_i, Gout_j, Bout_k) into "No" number of sets of values (QX, QY, QZ) and then into "No" number of sets of values (QL, Qa, Qb). The second color conversion portion 28 servers to convert the "No" number of sets of values (QL, Qa, Qb) into "No" number of sets of values (QC, QM, QY, QK). Thus, the third conversion characteristic memory 42 stores the sets of second intermediate signals (QC, QM, QY, QK) for all the lattice points (Rout_i, Gout_j, Bout_k) in the RGB color space W'.

Next will be given a detailed description of S10 and S11, i.e., the operation of the third color conversion portion 30.

When the portion 30 receives one set of tone signals (PR, PG, PB) of the inputted color data 62, the portion 30 converts the tone signal set (PR, PG, PB) into a set of control signals (PC, PM, PY, PK). The portion 30 performs this color conversion through performing an interpolation calculation on the second intermediate signals (QC, QM, QY, QK) stored in the memory 42 in the manner described below.

As shown in FIG. 8, a color point P is defined by the inputted tone signal set (PR, PG, PB) in the RGB color space W'. The color point P resides in a specific cube J'. The cube J' is defined by eight lattice points A, B, C, D, E, F, G, and H which surround the color point P. In S11, therefore, the portion 30 selects, from the third conversion characteristic memory 42, the eight sets of second intermediate signals (QC, QM, QY, QK), which are stored in correspondence with the sets of color signals (Rout_i, Gout j, Bout_k) for the eight lattice points A to H. The eight sets of second intermediate signals (QC, QM, QY, QK) will be respectively referred to as (Ac, Am, Ay, Ak), (Bc, Bm, By, Bk), (Cc, Cm, Cy, Ck), (Dc, Dm, Dy, Dk), (Ec, Em, Ey, Ek), (Fc, Fm, Fy, Fk), (Gc, Gm, Gy, Gk), and (Hc, Hm, Hy, Hk). The sets of color signals (Rout_i, Gout_j, Bout_k) for the lattice points A through H will be referred to as (Ar, Ag, Ab) through (Hr, Hg, Hb), respectively.

Figure 9:
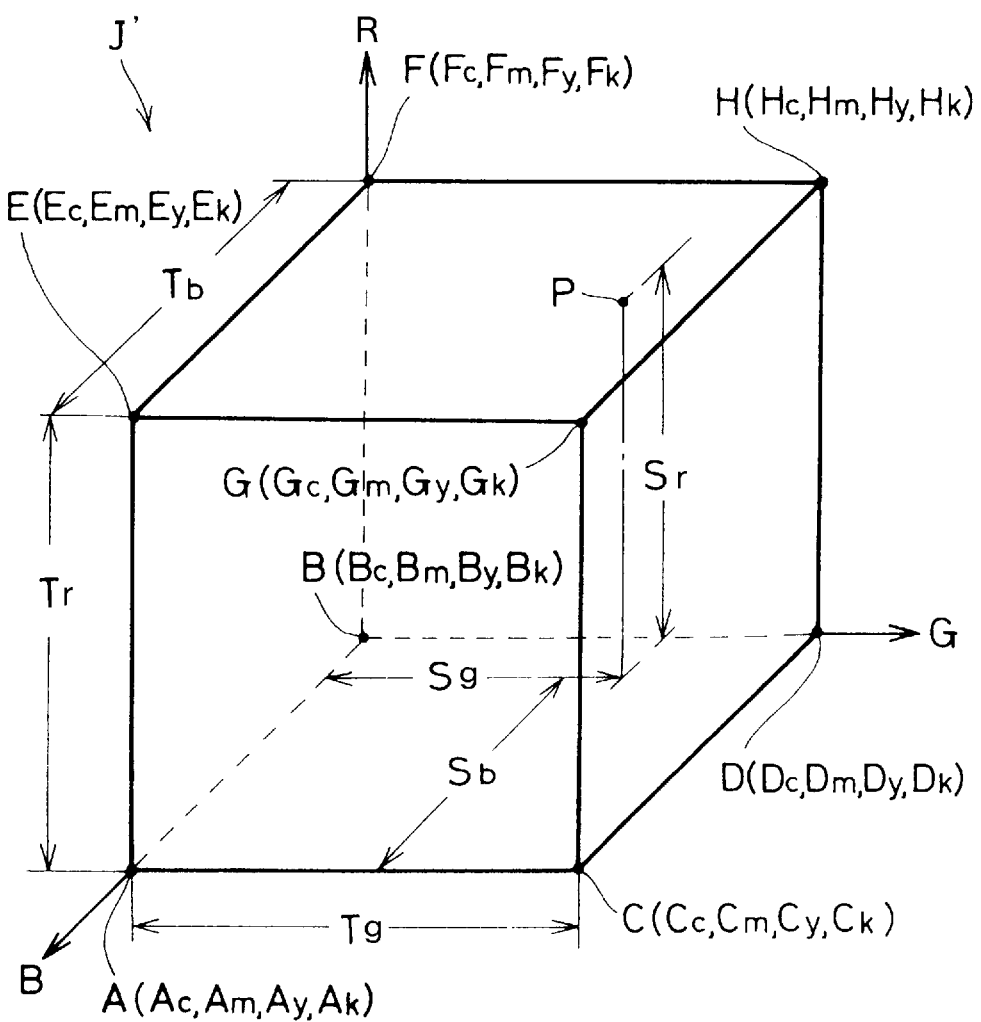
FIG. 9 illustrates an interpolation method employed for converting the values R, G, and B into values C, M, Y, and K in the third color conversion portion.

The portion 30 then calculates a control signal set (PC, PM, PY, PK) for the inputted tone signal set (PR, PG, PB) through an interpolation calculation as defined in the following formulas (7):

$$PC=KA*Ac+KB*Bc+KC*Cc+KD*Dc+KE*Ec+KF*Fc+KG*Gc+KH*Hc$$

$$PM=KA*Am+KB*Bm+KC*Cm+KD*Dm+KE*Em+KF*Fm+KG*Gm+KH*Hm$$

$$PY=KA*Ay+KB*By+KC*Cy+KD*Dy+KE*Ey+KF*Fy+KG*Gy+KH*Hy$$

$$PK=KA*Ak+KB*Bk+KC*Ck+KD*Dk+KE*Ek+KF*Fk+KG*Gk+KH*Hk \qquad \ldots (7)$$

where * indicates a multiplication, and the weight coefficients KA, KB, KC, KD, KE, KF, KG, and KH are defined in the following formulas (8):

$$KA=(Tr-Sr)*(Tg-Sg)*(Tb-Sb)/(Tr*Tg*Tb)$$

$$KB=(Tr-Sr)*(Tg-Sg)*Sb/(Tr*Tg*Tb)$$

$$KC=(Tr-Sr)*Sg*(Tb-Sb)/(Tr*Tg*Tb)$$

$$KD=(Tr-Sr)*Sg*Sb/(Tr*Tg*Tb)$$

$$KE=Sr*(Tg-Sg)*(Tb-Sb)/(Tr*Tg*Tb)$$

$$KF=Sr*(Tg-Sg)*Sb/(Tr*Tg*Tb)$$

$$KG=Sr*Sg*(Tb-Sb)/(Tr*Tg*Tb)$$

$$KH=Sr*Sg*Sb/(Tr*Tg*Tb) \qquad \ldots (8)$$

where Tr, Tg, Tb, Sr, Sg, and Sb represent distances defined below as shown in FIG. 9.

$$Tr=Hr-Ar,$$

$$Tg=Hg-Ag,$$

$$Tb=Hb-Ab,$$

$$Sr=PR-Ar,$$

$$Sg=PG-Ag,$$

and $$Sb=PB-Ab \qquad \ldots (9)$$

The values Tr, Tg, and Tb are the distances between the lattice points (vertex points) on the cube J' in the R, G, and B axial directions, and the values Sr, Sg, and Sb are the distances between the color point P and the main surfaces of the cube J' in the R, G, and B axial directions.

Thus, the inputted tone signal set (PR, PG, PB) is converted into the control signal set (PC, PM, PY, PK) in S11.

The steps of S10 and S11 are repeatedly performed for converting all the tone signal sets (PR, PG, PB) into control signal sets (PC, PM, PY, PK). The thus obtained control signal sets (PC, PM, PY, PK) are supplied to the print head 18. The print head 18 is controlled by the supplied control signals to print all the picture elements of the inputted image data.

Through performing the above-described operations, the printer 2 of the present embodiment attains great advantages as described below.

A great amount of calculations (1)–(5) are required in order to convert the great number of tone signal sets (PR, PG, PB) of the color data 62 into CIE values and then into print head control signals. However, according to the above-described operations, only a limited number of color signal sets (Rout__i, Gout__j, Bout__k), generated by the signal generator 24, are subjected to the great amount of calculations (1)–(5) and are converted into the limited number of second intermediate signal sets (QC, QM, QY, QK). In the example where the number STEP is set as eight (8), only 729 color signal sets are subjected to the calculations (1)–(5) and converted into 729 sets of second intermediate signals.

The great number of tone signal sets (PR, PG, PB) of the color data 62 are converted into control signal sets (PC, PM, PY, PK) through the simple interpolation calculations (7)–(9) with using several sets of the second intermediate signals (QC, QM, QY, QK). Accordingly, the printer 2 can obtain the control signals (PC, PM, PY, PK) within a short period of time.

It is further noted that the signal generator 24 generates the color signals (Rout__i, Gout__j, Bout__k) in S5 only after the first conversion characteristic memory 40 is properly inputted in S4 with the profile data 60 which is transmitted from the external CPU 4 together with the color data 62. Accordingly, the second intermediate signals (QC, QM, QY, QK) are properly created based on a color conversion characteristic indicated by the profile data 60. In addition, the third color conversion portion 30 starts performing color conversion operation in S11 only after it is judged in S9 that the signal generator 24 completes generating the color signals (Rout__i, Gout__j, Bout__k). Accordingly, it is reliable that the tone signals (PR, PG, PB) of the input color data 62 be converted into control signals (PC, PM, PY, PK) based on the profile data 60 which is appropriate for the color data 62. The inputted color data 62 can therefore be subjected to an appropriate color conversion operation.

The conversion characteristic correction portion 22 performs the judging operation in S3. The third conversion characteristic memory 42 is created only when the inputted profile data 60 is not consistent with the memory contents of the first conversion characteristic memory 40. Accordingly, the second intermediate signals (QC, QM, QY, QK) are not produced when the color conversion characteristic appropriate for the newly-inputted color data 62 is consistent with the previously-stored characteristic. It therefore becomes possible to reduce the total printing time lengths when the printing is performed a plurality of times for image data with the same profile data 60.

The user can manipulate the key board 16 to thereby change the number "STEP" stored in the memory 46. That is, in response to the instruction from the key board 16, the signal characteristic correction portion 36 can change a characteristic how the signal generator 24 generates the color signals (Rout__i, Gout__j, Bout__k). Through decreasing the number "STEP," the processing rate can further be enhanced.

It is noted that the memory 46 may store data of other various conditions how the signal generator 24 generates the color signals (Rout__i, Gout__j, Bout__k). For example, the user may manipulate the key board 16 so that the portion 36 will input to the memory 46 instruction data that the signal generator 46 should generate an increased number of color signals (Rout__i, Gout__j, Bout__k) within a certain color range that present a low conversion accuracy.

It is further noted that the signal characteristic correction portion 36 may perform operations other than the above-described key board-controlled operation. For example, the portion 36 may detect characteristic of the inputted color data 62 through analyzing the newly-stored contents of the memory 40. When the portion 36 detects that each component of the color data 62 is constructed based on a CRT tone signal, the correction portion 36 may provide the memory 46 with instruction data that the generator 24 should generate the color signals (Rout__i, Gout__j, Bout__k) at an interval which decreases toward a low brightness region. When the portion 36 detects that each component of the color data 62 is constructed according to the CIE Lab colorimetric system, the correction portion 36 may provide the memory 46 with an instruction that the generator 24 should generate the color signals (Rout__i, Gout__j, Bout__k) at a uniform interval.

Thus, data in the memory 46 can be corrected in accordance with the contents of the memory 40 indicative of the inputted signal characteristic. Accordingly, it is possible to create the contents of the third conversion characteristic memory 42 so that the contents will suite for the inputted signals. The printer can therefore provide a good color reproduction operation.

As described above, before start of the conversion operation of FIG. 7, the user selects either one of the memories 14a, 14b, and 14c that stores conversion characteristic values (WC, WM, WY, WK) appropriate for the inputted image data. If an address data previously stored in the selected value memory 44 is the same as the user's presently-selected memory, the conversion process of FIG. 7 directly starts. However, if the previously-stored address is different from the user's presently-selected memory, the user has to change the value (lead address value) stored in the memory 44 before the color conversion operation of FIG. 7 starts. The user corrects the value in the memory 44 in a manner described below.

The user first manipulates the key board 16 to instruct a selected value correction mode. The selected value correction portion 34 then waits for input of a corrected value. The user then manipulates the key board 16 to input a corrected value indicative of either one of the memories 14a, 14b, and 14c that the user has just selected. As a result, the selected value correction portion 34 inputs, in the selected value memory 44, a lead address of the selected memory.

It is noted that this selected value correction operation can be achieved after the color conversion operation of FIG. 7 starts. In this case, it becomes necessary to recreate the second intermediate signals (QC, QM, QY, QK) with the newly-selected control signal sets (WC, WM, WY, WK).

In view of this, the judging step S13 is provided as shown in FIG. 7 to judge whether or not the portion 34 rewrites data (lead address data) in the memory 44 through the above-described correction operation. When the portion 34 rewrites data in the memory 44, the program proceeds back to S5 where the portion 34 instructs the signal generator 24 to again generate the several sets of color signals (Rout_i, Gout_j, Bout_k). Then, the same processes as those of S5 through S9 are repeated, thereby correcting the memory contents in the third conversion characteristic memory 42. Afterwardly, the color data 62 is converted into control signals through S10 through S12.

As described above, because the printer 2 is provided with the memories 14a–14c which store the three different color conversion characteristics A, B, and C. The printer 2 allows the user to select one conversion characteristic suitable for the inputted color data 62. The printer 2 can therefore perform the user's selected color conversion operation on the color data 62. Every time the user changes his/her desired one conversion characteristic (yes in S13), the signal generator 24 is instructed to generate color signals (Rout_i, Gout_j, Bout_k) in S5 and then to recreate the second intermediate signals (QC, QM, QY, QK) to be stored in the third conversion characteristic memory 42. Accordingly, it becomes possible to maintain the high speed process even when the color conversion characteristic is changed according to the user's choice.

It is possible to create the second intermediate signals (QC, QM, QY, QK) during a time period from when the selected value correction portion 34 changes the user's selected conversion data in the memory 44 until when the color data 62 is transmitted from the external CPU 4. It is therefore possible to reduce a process time required for changing the color conversion characteristic.

Next, a second embodiment of the present invention will be described with reference to FIGS. 10, 11, and 12.

Figure 10:
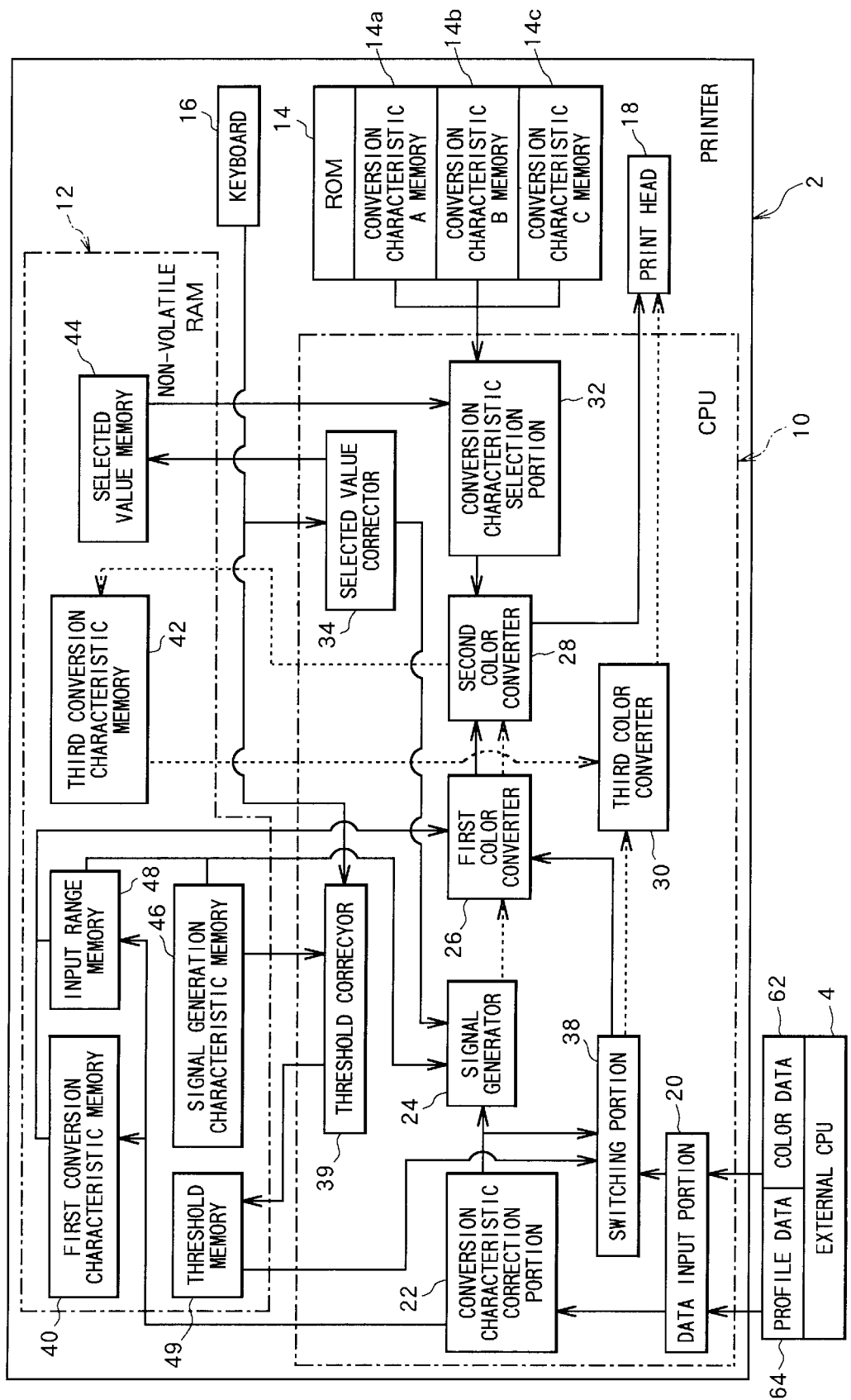
FIG. 10 is a functional block diagram of a structure of a printer 2 according to a second embodiment of the present invention.

FIG. 10 is a functional block diagram of the printer 2 according to the second embodiment. Components in the present embodiment the same as those in the first embodiment are designated by the same reference numerals to avoid duplicating description.

According to the present embodiment, the CPU 10 includes: the first color conversion portion 26 and the second color conversion portion 28 which are for performing a first conversion process; the third color conversion portion 30 for performing a second conversion process; a switching portion 38 for selecting one of the first and second conversion processes and for switching between the first and second conversion processes; and a threshold correction portion 39 for serving as a switching characteristic correction portion. The non-volatile RAM 12 is further formed with a threshold memory 49 which serves as a conversion process switching characteristic memory.

The data input portion 20 is connected to the external CPU 4, the conversion characteristic correction portion 22, and the switching portion 38. The data input portion 20 is for receiving profile data 64 and color data 62, i.e., a plurality of sets of tone signals (PR, PG, PB), from the external CPU 4. The data input portion 20 serves to output data to both the conversion characteristic correction portion 22 and the switching portion 38.

The switching portion 38 is connected to the data input portion 20, the threshold memory 49, the first color conversion portion 26, and the third color conversion portion 30. The switching portion 38 is for receiving data from the data input portion 20 and data (threshold value) stored in the threshold memory 49. The switching portion 38 compares the received data with each other. Based on the compared result, the switching portion 38 outputs color data 62 to either one of the first color conversion portion 26 and the third color conversion portion 30 (as indicated by a dotted line in FIG. 10). Both the second color conversion portion 28 (which is connected to the first color conversion portion 26) and the third color conversion portion 30 are connected to the print head 18. The portion 28 outputs control signal sets (PC, PM, PY, PK) to the print head 18 during the first conversion process. The portion 30 outputs control signal sets (PC, PM, PY, PK) to the print head 18 during the second conversion process.

The threshold correction portion 39 is connected to both the signal generating characteristic memory 46 and threshold memory 49. The threshold correction portion 39 is for retrieving data from the memory 46 and for rewriting a threshold value in the threshold memory 49.

According to the present embodiment, the profile data 64 not only includes the conversion process data (γr, γg, γb, Xr, Yr, Zr, Xg, Yg, Zg, Xb, Yb, Zb, Xn, Yn, Zn) and the color range data (Rmax, Gmax, and Bmax and the minimum values Rmin, Gmin, and Bmin) but also includes data "SIZE" indicative of an amount of the color data 62. In this example, the data "SIZE" indicates the total number of picture elements in an entire image represented by the color data 62.

Or, the data "SIZE" may indicate a value for calculating the total number of the picture elements, or the like. For example, the data "SIZE" may be constituted from a pair of values "WIDTH" and "LENGTH". The value "WIDTH" is indicative of the number of picture elements arranged in a widthwise direction of the image. The value "LENGTH" is indicative of the number of picture elements arranged in a lengthwise direction of the image. In this case, the total number "SIZE" of the picture elements is calculated by the following formula (10):

$$\text{SIZE} = \text{WIDTH} * \text{LENGTH} \qquad \ldots (10)$$

Except for the above-described points, the structure of the printer 2 of the present embodiment is the same as that of the first embodiment.

Figure 11:
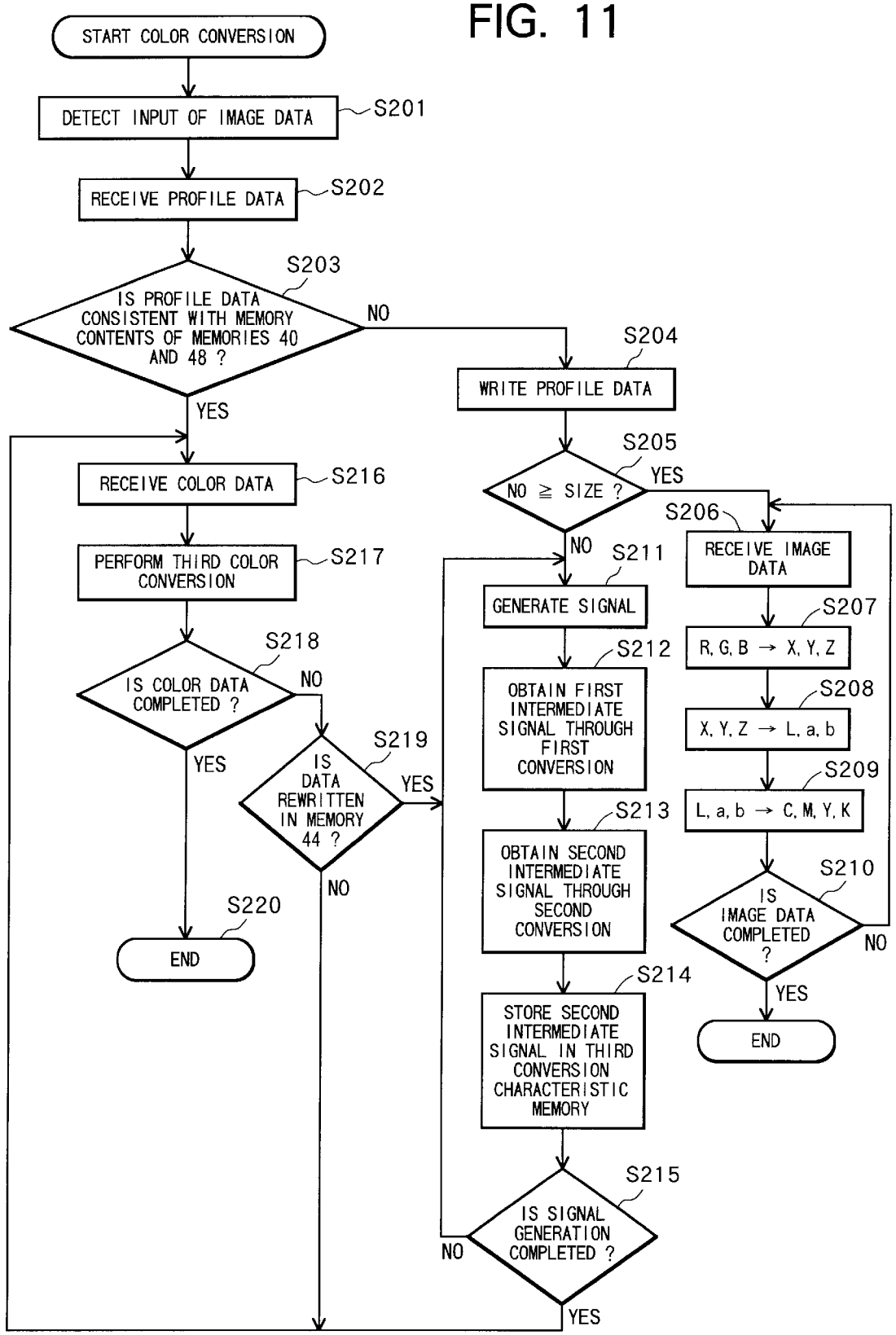
FIG. 11 is a flow chart illustrating the processings attained by the second embodiment of FIG. 10.
Figure 12:
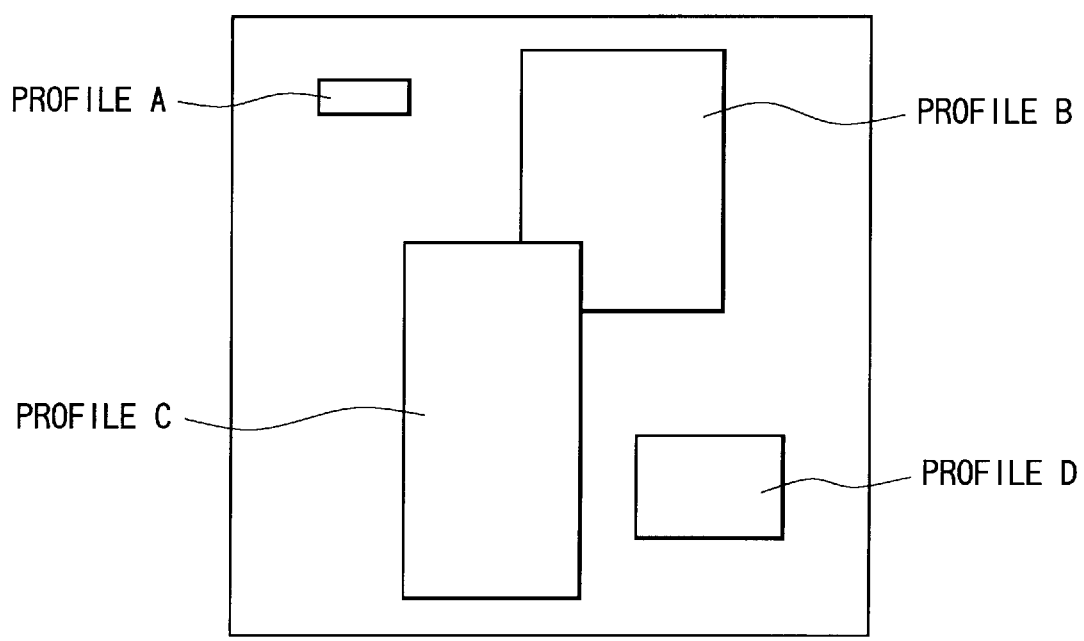
FIG. 12 illustrates structure of input image data.

As shown in FIG. 11, similarly as in the first embodiment, when the color conversion operation starts, the CPU 10 in the printer 2 performs, in S201 and S202, the same processes as the steps S1 and S2 of the first embodiment. That is, when the CPU 10 detects input of image data, the data input portion 20 receives the profile data 64. Upon receipt of the profile data 64, in the same manner as in the first embodiment, the data input portion 20 supplies the conversion characteristic correction portion 22 with the conversion process data and the color range data. It is noted that according to the present embodiment, the data input portion 20 supplies the data "SIZE" to the switching portion 38.

The conversion characteristic correction portion 22 performs, in S203, the operations the same as that of the step S3 in the first embodiment. That is, when it is judged that the profile data 64 is consistent with the contents in the memories 40 and 48 (yes in S203), the program proceeds to S216, and operations of S216 through S220 are repeatedly performed. In S216 through S220, the third color conversion portion 30 performs the same operations as S10 through S14 in the first embodiment. On the other hand, when the profile data 64 is not consistent with the contents in the memories 40 and 48 (no in S203), the program proceeds to S204 where the conversion process data in the profile data 64 is written in the memories 40 and 48 in the same manner as in S4 of the first embodiment.

It is noted that the threshold memory 49 previously stores therein, as a threshold value, the number "No" represented by the following formula: No=(STEP+1)*(STEP+1)*(STEP+1). (The value "STEP" is stored in the memory 46 in the same manner as in the first embodiment.) The threshold value "No" therefore represents the total number of color signals (Rout_i, Gout_j, Bout_k) to be generated by the signal generator 24.

The switching portion 38 then compares in S205 the data "SIZE" received from the data input portion 20 with the threshold "No" stored in the memory 49. Based on the compared results, the switching portion 38 selects one of the first and second color conversion processes. In more concrete terms, the switching portion 38 selects the first color conversion process when the value No is equal to or higher than the value SIZE (No≧SIZE). The switching portion 38 selects the second color conversion process when the value No is lower than the value SIZE (No<SIZE).

Afterwardly, the data input portion 20 supplies the switching portion 38 with the color data 62 which is inputted from the external CPU 4. The switching portion 38 outputs the color data 62 to either one of the first color conversion portion 26 and the third color conversion portion 30 in accordance with the selected color conversion process. In more concrete terms, when the first color conversion process is selected (yes in S205,) the switching portion 38 starts outputting the color data 62 to the first color conversion portion 26. On the other hand, when the second color conversion process is selected (No in S205), the switching portion 38 outputs in S216 the color data 62 to the third color conversion portion 30.

The first color conversion process performed by the first and second color conversion portions 26 and 28 will be described below.

Figure 3:
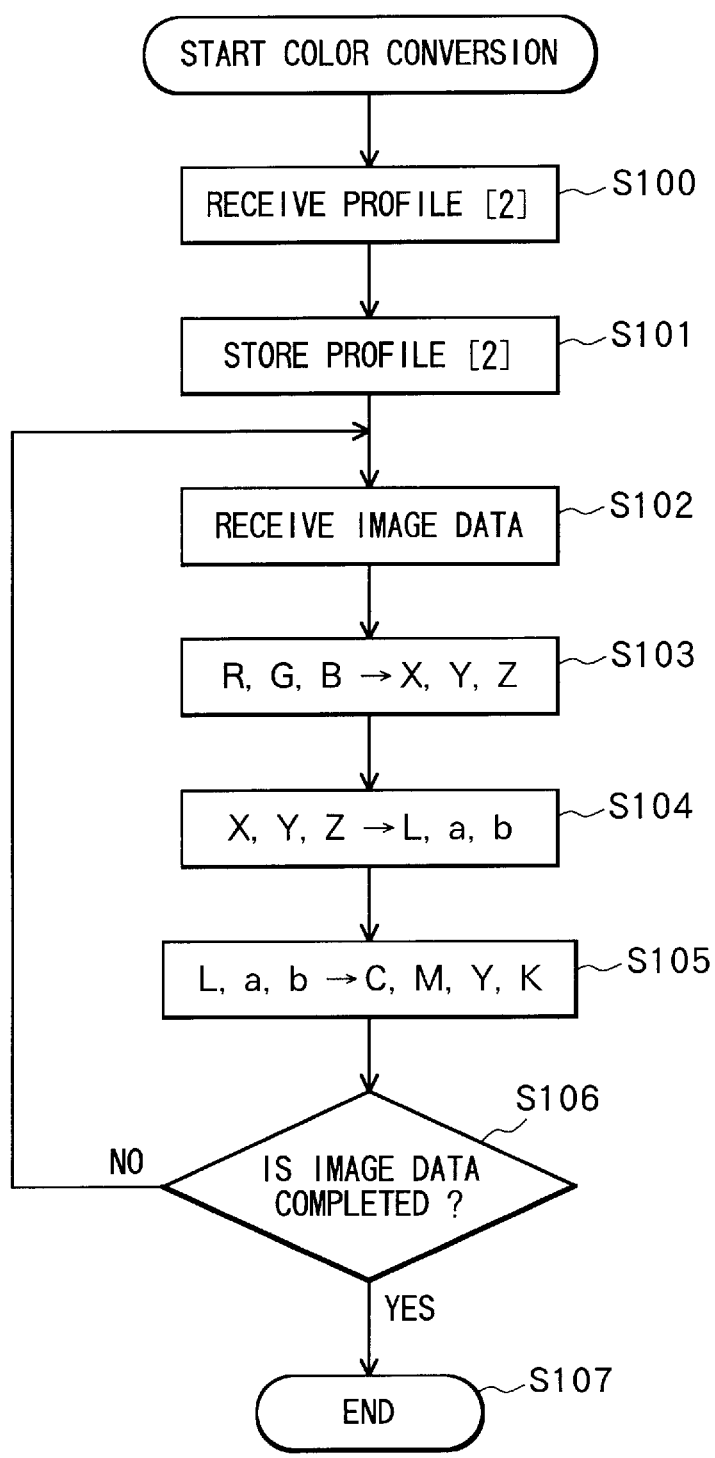
FIG. 3 is a flow chart illustrating the conceivable color conversion processings.
Figure 4:
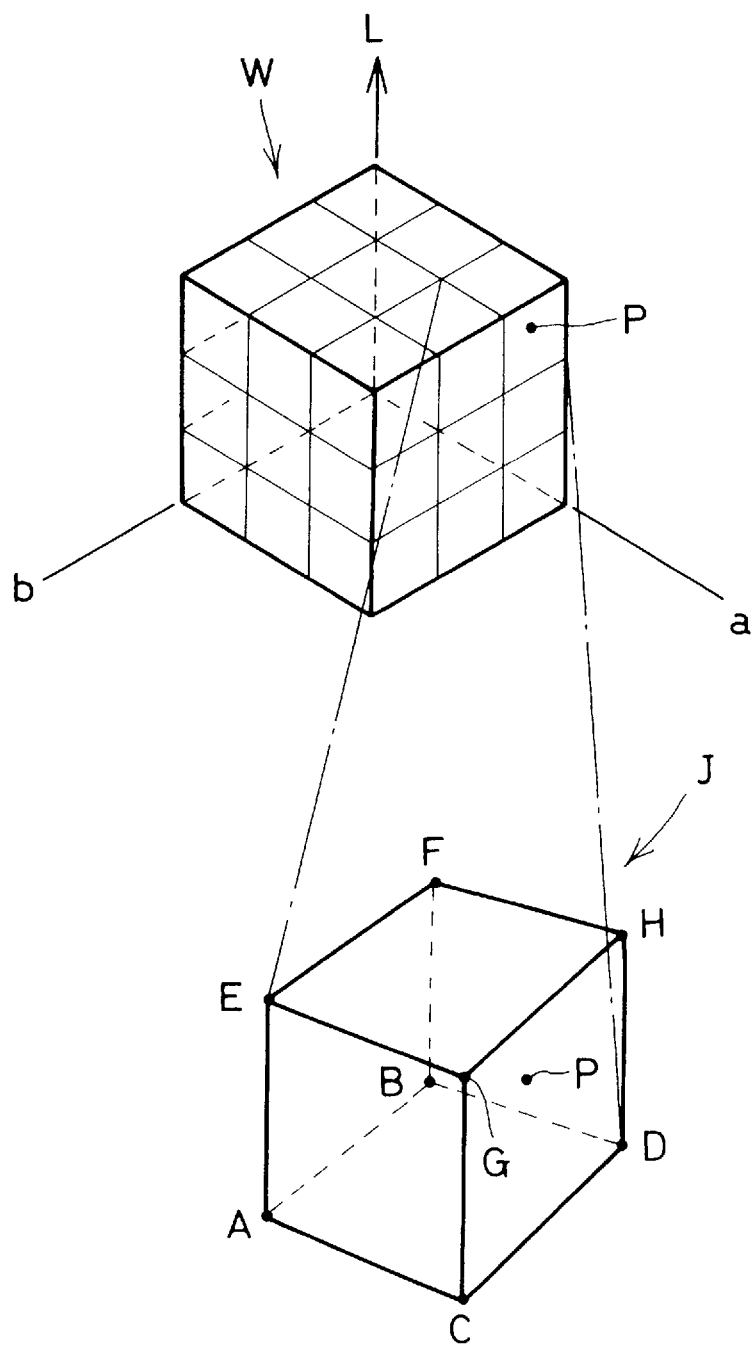
FIG. 4 illustrates an Lab colorimetric space defined in a second color conversion portion of the conceivable device.

The first color conversion process S206 through S210 is the same as the conversion process of S102 through S106 already described with reference to FIG. 3. In other words, the first color conversion portion 26 and the second color conversion portion 28 successively convert a plurality of sets of tone signals (PR, PG, PB) in the color data 62 into a plurality of sets of control signals (PC, PM, PY, PK).

In more concrete terms, when the first color conversion portion 26 receives one set of tone signals (PR, PG, PB) in S206, the portion 26 converts the set of signals (PR, PG, PB) into a set of values (PX, PY, PZ) through the formulas (2) with using the conversion process data (γr, γg, γb, Xr, Yr, Zr, Xg, Yg, Zg, Xb, Yb, Zb) now stored in the memory 40. The portion 26 further converts in S208 the set of values (PX, PY, PZ) into a set of values (PL, Pa, Pb) through the formulas (1) with using the remaining conversion process data (Xn, Yn, Zn) also stored in the memory 40. The portion 26 supplies the set of values (PL, Pa, Pb) as a set of first intermediate signals to the second color conversion portion 28.

The portion 28 then converts in S209 the set of values (PL, Pa, Pb) into a set of control signals (PC, PM, PY, PK) through the formulas (3)–(5) with using the control signal values (WC, WM, WY, WK) retrieved by the portion 32 from the user's selected memory 14a, 14b, or 14c. The portion 28 therefore outputs the set of control signals (PC, PM, PY, PK), as a set of second intermediate signals, to the print head 18.

Through S210, the portions 26 and 28 perform the above-described operations repeatedly to convert all the tone signals (PR, PG, PB) into the control signal sets (PC, PM, PY, PK). Thus, according to the first conversion process, the signal generator 24 is not controlled to generate color signals (Rout_i, Gout_j, Bout_k).

Next, the second conversion process of S211 through S220 will be described.

The second color conversion process is the same as the conversion processes S5–S14 performed in the first embodiment. That is, the signal generator 24 repeatedly performs the operation of S211 to thereby generate the "No" number of color signals (Rout_i, Gout_j, Bout_k) based on data stored in the memories 46 and 48. The first color conversion portion 26 repeatedly performs the operation of S212 to convert the "No" number of color signals (Rout_i, Gout_j, Bout_k) into "No" number of sets of values (QX, QY, QZ) and then into "No" number of first intermediate signals (QL, Qa, Qb) with using data stored in the first conversion characteristic memory 40. The second color conversion portion 28 repeatedly performs the operation of S213 to convert the "No" number of first intermediate signals (QL, Qa, Qb) into "No" number of second intermediate signals (QC, QM, QY, QK) with using the control signal values (WC, WM, WY, WK) retrieved by the portion 32 from the user's selected memory 14a, 14b, or 14c. The third conversion characteristic memory 42 is thus created in S214 from the second intermediate signals (QC, QM, QY, QK). When the "No" number of signal sets (QC, QM, QY, QK) are thus completely created through S211–S215, the third color conversion portion 30 starts receiving the color data 62 from the switching portion 38 in S216. The portion 30 repeatedly performs S216–S219 to convert the inputted plurality of sets of tone signals (PR, PG, PB) into a plurality of sets of control signals (PC, PM, PY, PK) with using the second intermediate signals (QC, QM, QY, QK) now created in the memory 42. It is noted that when data in the memory 44 is rewritten in S219, the portion 34 instructs the portion 24 to again generate the signals (Rout_i, Gout_j, Bout_k) in S211 in the same manner as in S13 of the first embodiment. The portion 30 supplies the control signals (PC, PM, PY, PK) to the print head 18.

Thus, according to both the first and second conversion processes, control signals (PC, PM, PY, PK) are finally obtained, and supplied to the print head 18. The print head 18 will be controlled by the control signals to print out the image represented by the inputted color data (PR, PG, PB).

As described above, the second embodiment attains great advantages as described below.

It is assumed that the external CPU 4 supplies four groups of color data 62 with four different kinds of profile data 64. Each group of color data is for producing a corresponding image region A through D as shown in FIG. 12. In order to print out the four regions, the color conversion operation has to be performed onto the four groups of color data 62 with the four sets of profile data 64. In such a case, if the second conversion process is selected for all the regions, the signal generator 24 will have to generate the "No" number of color signal sets (Rout_i, Gout_j, Bout k) four times. In each color conversion process, the "No" number of color signal sets (Rout_i, Gout_j, Bout_k) will be subjected to the conversion operations by the first and second conversion portions 26 and 28.

In this case, it is assumed that a certain region (in this example, a region A) is very small and is comprised of a very small number of picture elements. The number of the picture elements (PR, PG, PB) in the region A is less than the number "No" of the color signal sets (Rout_i, Gout_j, Bout_k). In this case, in order to process the region A within a shorter time period, the region A should be processed through the first conversion process rather than through the second conversion process. This is because the amount of the calculations required during the first conversion process will be less than that of the calculations required during the second conversion process. In this case, therefore, the first conversion process is selected to cause the portions 26 and 28 to directly convert the color data 62 in the region A into control signals.

Accordingly, in the present embodiment, the switching portion 38 judges which of the first and second conversion processes can perform conversion operations within a shorter time period through comparing the number of pixels "SIZE," to be subjected to the first color conversion process, with the number of pixels "No" to be subjected to the second color conversion process. Then, a process of a higher rate is selected according to the judged result. It is therefore possible to always select a higher rate color conversion process for each image region A–D, and therefore it is possible to perform an entire printing process within a shorter time period.

It is noted that when the value "STEP" in the signal generating characteristic memory 46 is corrected in the manner as in the first embodiment, the threshold correction portion 39 retrieves the corrected value "STEP" from the memory 46, and corrects the threshold "No" in the threshold memory 49 so that the threshold "No" satisfies the following equation: No=(STEP+1)*(STEP+1)*(STEP+1). For example, when the value "STEP" stored in the signal generating characteristic memory 46 is eight (8), 729 is stored in the threshold memory 49 as the threshold "No." When the value STEP is changed into 16, the threshold "No" of 729 is changed into 4913.

Accordingly, when the value "STEP" stored in the memory 46 is corrected into a user's desired value, the value "No" in the threshold memory 49 is also corrected to satisfy the above-described equation. The switching portion 38 can therefore always select a higher rate color conversion process with respect to any user's demands.

As described above, in the color conversion device according to the present invention, the first color conversion portion is designed so as to be capable of converting input signals into first intermediate signals. The second conversion portion is designed so as to be capable of converting the first intermediate signals into second intermediate signals. The first conversion characteristic memory stores a conversion characteristic of the first color conversion portion. The second conversion characteristic memory stores a conversion characteristic of the second color conversion portion. The signal generation portion is designed to generate several color signals which are defined within an inputtable range of the input signals. The third conversion characteristic memory stores, as a third conversion characteristic, second intermediate signals which are obtained though converting the color signals generated from the signal generation portion by the first and second conversion portions. The third color conversion portion converts the input signals with the third conversion characteristic stored in the third conversion characteristic memory, and outputs the obtained signals as output signals.

Accordingly, the signal generation portion generates only a small number of color signals, which are representative signals of the input range of the input signals. The small number of signals are subjected to the conversion operations by the first and second color conversion portions. Even though the color conversion process as employed in each of the first and second color conversion portions performs a complicated calculation onto each signal, the total number of calculations will become small. The input signals of the input image are subjected to a color conversion operation by the third color conversion portion based on the third color conversion characteristic which has been obtained based on the representative signals. Accordingly, the third color conversion portion can perform a simple calculation on the input signals to actually convert the input signals into output signals. The color conversion processing is performed within a shortened time period.

Especially, the input detection portion detects input of the input signals. The signal generation portion starts generating the color signals after the input detection portion detects input of the input signals. Accordingly, it is possible to reliably create the third color conversion characteristic through a color conversion operation which is determined based on color conversion characteristic information inputted together with the input signals.

The signal generation detection portion detects whether the signal generation portion completes generating the color signals. The third color conversion portion starts converting the input signals into output signals after the signal generation detection portion detects completion of the signal generation. Accordingly, the input signals can be certainly converted with color conversion characteristics prepared as suitable for the input signals. The color conversion device can therefore produce a good quality image.

The amount determining portion determines an amount of the input signals. The conversion process switching portion switches between a first conversion process and a second conversion process based on results determined by the amount determining portion. The first conversion process is for converting the input signals into the output signals with using the first and second color conversion portions. The second conversion process is for converting the input signals into the output signals with using the third color conversion portion. Accordingly, the conversion process switching portion selects a color conversion process suitable for the amount of the input signals. The color conversion device can perform the color conversion operation within a shorter time period.

The color conversion characteristic correction portion corrects at least one of the conversion characteristics stored in the first and second conversion characteristic memories. The correction state detection portion detects the correction states of the first conversion characteristic memory and the second conversion characteristic memory. The signal generation portion starts generating signals when the correction state detection portion detects completion of the correction by the color conversion characteristic correction portion. Accordingly, the signal generation portion generates signals whenever at least one of the first and second conversion characteristic memories is corrected. According to this arrangement, the third conversion characteristic memory can always properly store a conversion characteristic obtained based on the corrected characteristics. The color conversion device can always obtain good quality images within a short period of time.

The input signal range memory stores a maximum value and a minimum value of the input range of the input signals. The signal generation portion outputs color signals through dividing the range between the maximum value and the minimum value stored in the input signal range memory. Accordingly, the signal generation portion generates color signals based on the maximum and minimum values of the input range of the input signals and values obtained through dividing the input range. Accordingly, the signal generation portion generates a small number of the color signals. Accordingly, the first color conversion portion and the second color conversion portion perform a small number of calculations to produce a small number of second intermediate signals. The third conversion characteristic memory will store a short length of data. The third color conversion portion can obtain a good image based on the small amount of data.

While the invention has been described in detail with reference to specific embodiments thereof, it would be apparent to those skilled in the art that various changes and modifications may be made therein without departing from the spirit of the invention.

For example, the above-described embodiments are directed to the printer where a print head is internally provided in the printer. However, the color conversion device of the present invention is unnecessarily provided with the print head. The color conversion device may be designed to output the control signals (PC, PM, PY, PK) to an external print head.

In the above description, each of the profile data 60 and 64 includes the color range data (Rmax, Gmax, Bmax, Rmin, Gmin, and Bmin). However, the profile data may not include the color range data. The portion 22 may determine those values Rmax, Gmax, Bmax, Rmin, Gmin, and Bmin through searching all the plurality of sets of input tone signal sets (PR, PG, PB).

Figure 13:
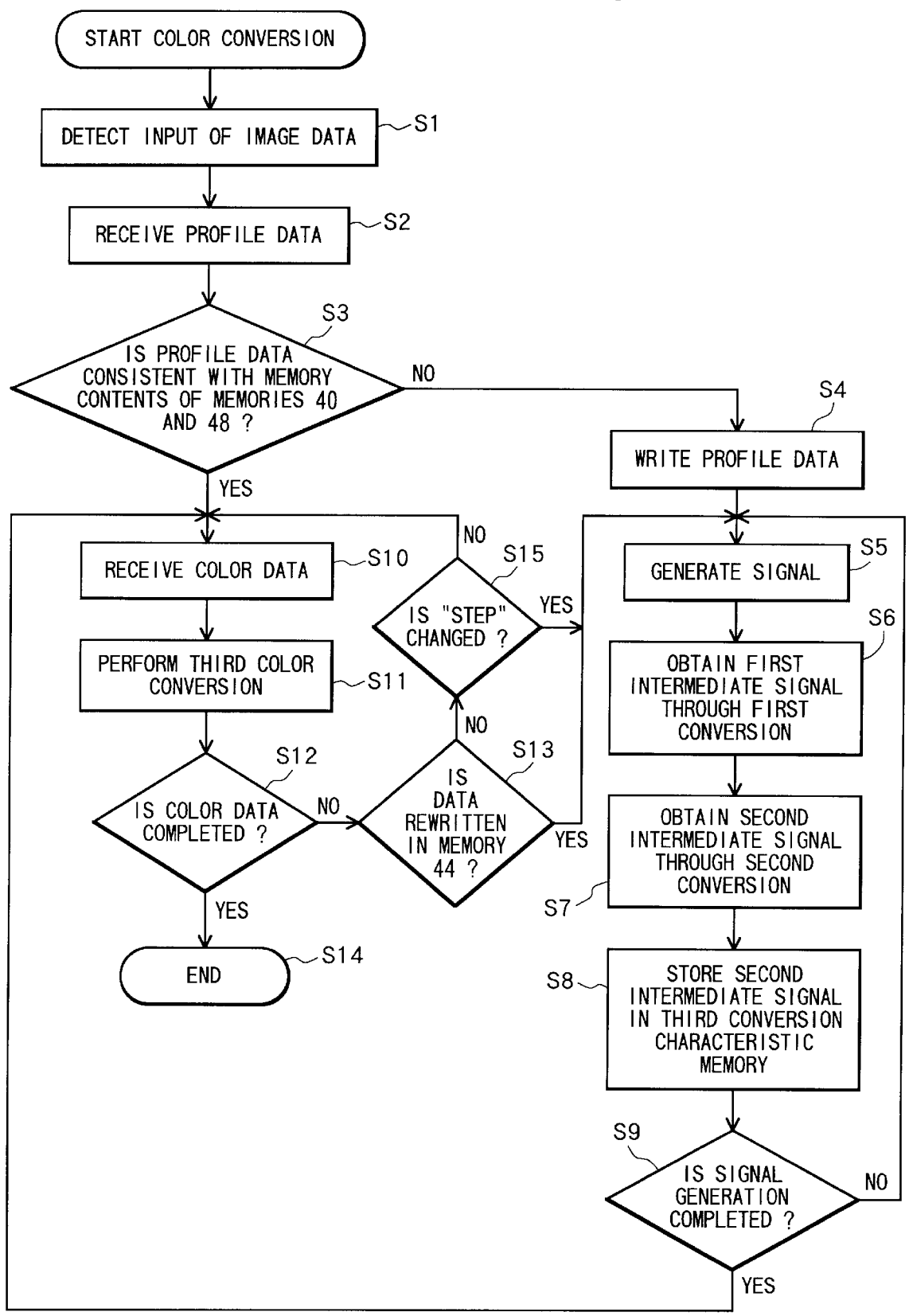
FIG. 13 is a flow chart illustrating a modification of the processings attained by the first embodiment of FIG. 6.

Generally, the user changes the value "STEP" stored in the memory 46 before the color conversion operation (FIG. 7 or FIG. 11) starts. However, the user may change the value "STEP" during the color conversion operation. In view of this, the color conversion operation of the first embodiment may be modified as shown in FIG. 13. That is, a step S15 is additionally provided to detect the change of the value STEP. When the change is detected, the program proceeds back to S5 where the portion 24 again starts generating the signals (Rout_i, Gout_j, Bout_k) in accordance with the changed value "STEP".

Figure 14:
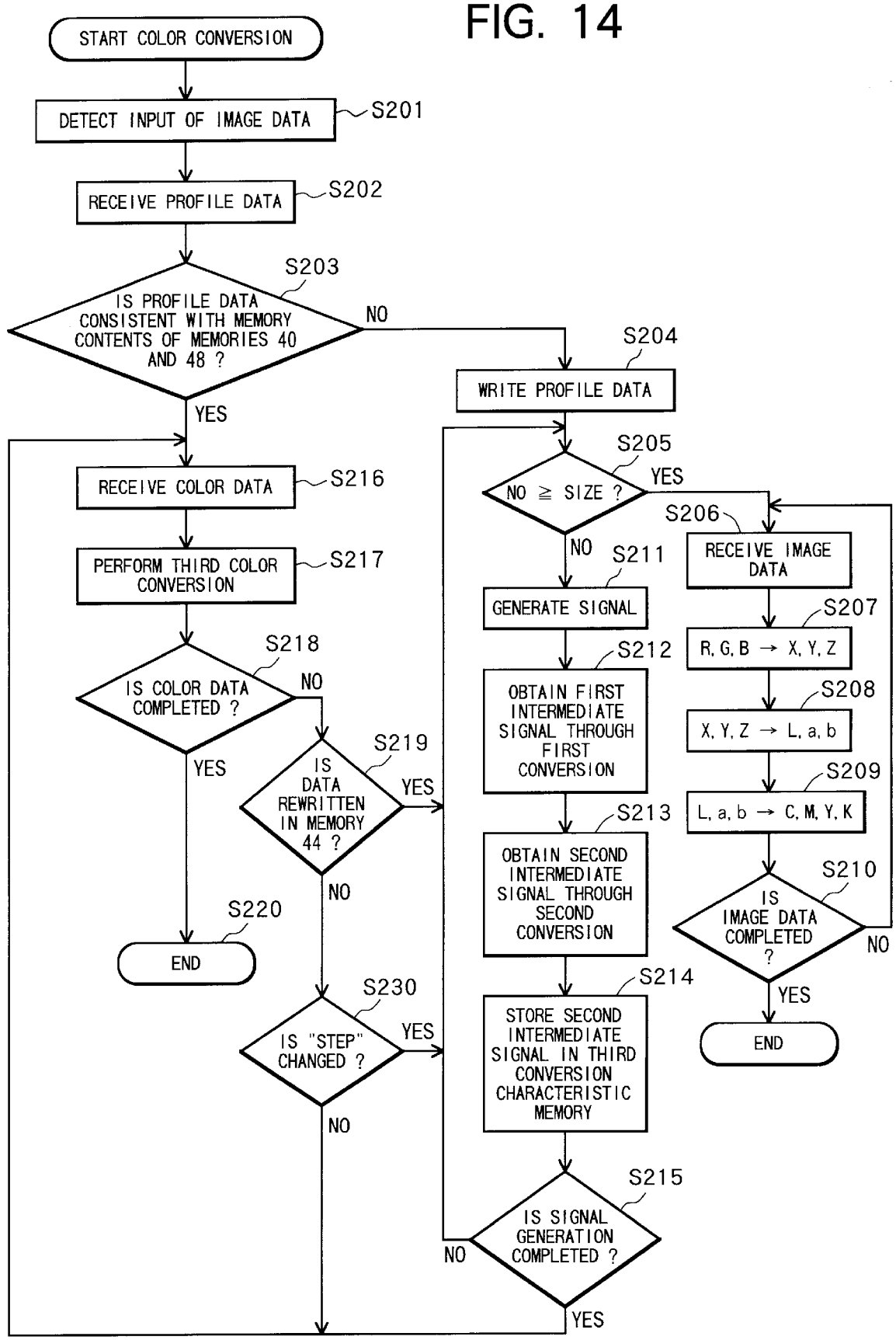
FIG. 14 is a flow chart illustrating a modification of the processings attained by the second embodiment of FIG. 10.

Similarly, the color conversion operation of the second embodiment may be modified as shown in FIG. 14. That is, a step S230 is additionally provided for detecting the change. When the change is detected, the program proceeds back to S205 where the value "No," which changes according to the change of the "STEP," is compared with the value "SIZE". If the value "SIZE" is higher than "No", (no in S205), the portion 24 again starts generating the signals (Rout_i, Gout j, Bout_k) in accordance with the changed value "STEP".

What is claimed is:

1. A color conversion device, comprising:

input signal receiving means for receiving input signals;

first color conversion means capable of converting input signals into first intermediate signals;

second color conversion means capable of converting the first intermediate signals into second intermediate signals;

first conversion characteristic memory means for storing a first conversion characteristic of the first color conversion means;

second conversion characteristic memory means for storing a second conversion characteristic of the second color conversion means;

signal generation means for generating representative signals of an input range within which input signals spread;

third conversion characteristic memory means for storing, as a third conversion characteristic, second intermediate representative signals which are obtained through converting the representative signals by the first color conversion means and the second color conversion means; and third color conversion means for converting the input signals with the third conversion characteristic stored in the third conversion characteristic memory means and for outputting the obtained signals as output signals.

2. A color conversion device as claimed in claim 1, further comprising:

input detection means for detecting input of the input signals; and signal generation detection means for detecting representative signal generation by the signal generation means, wherein the signal generation means starts generating the representative signals after the input detection means detects input of the input signals, and the third color conversion means starts converting the input signals after the signal generation detection means detects completion of the representative signal generation.

3. A color conversion device as claimed in claim 1, further comprising:

amount determining means for determining an amount of the input signals; and conversion process switching means for switching between a first conversion process and a second conversion process based on results determined by the amount determining means, the first conversion process being for converting the input signals into output signals with using the first and second color conversion means, the second conversion process being for converting the input signals into output signals with using the third color conversion means.

4. A color conversion device as claimed in claim 1, further comprising:

color conversion characteristic correction means for correcting at least one of the first conversion characteristic and the second conversion characteristic stored in the first and second conversion characteristic memory means; and correction state detection means for detecting the correction states of the first conversion characteristic memory means and the second conversion characteristic memory means, wherein the signal generation means starts generating the representative signals when the correction state detection means detects completion of the correction by the color conversion characteristic correction means.

5. A color conversion device as claimed in claim 1, is further comprising input signal range memory means for storing a maximum value and a minimum value of the input range of the input signals, and wherein the signal generation means generates the representative signals which are obtained through dividing the range between the maximum value and the minimum value stored in the input a signal range memory means.

6. A color conversion device as claimed in claim 1, further comprising:

input signal reception portion for receiving the input signals from an external device, the input signals being defined in a first color system and spreading within the input range; and output signal execution means for performing a predetermined process with using the output signals, the output signals being defined in a second color system different from the first color system.

7. A color conversion device as claimed in claim 6, wherein the first conversion characteristic is determined to convert a signal, defined in the first color system, into another signal defined in a third color system different from the first and second color systems, and wherein the second conversion characteristic is determined to convert the signal defined in the third color system into another signal defined in the second color system.

8. A color conversion device as claimed in claim 7, wherein the first color conversion means converts the representative signals, which are defined in the first color system, into first intermediate representative signals which are defined in the third color system, and the second color conversion means converts the first intermediate representative signals into the second intermediate representative signals which are defined in the second color system, and wherein the third color conversion means interpolates the second intermediate representative signals to thereby convert the input signals into the output signals.

9. A color conversion device as claimed in claim 8, wherein the first color system is a RGB color system, the second color system is a CMYK color system, and the third color system is a CIE color system.

10. A color conversion device as claimed in claim 3, further comprising:

input signal reception portion for receiving the input signals from an external device, the input signals being defined in a first color system; and output signal execution means for performing a predetermined process with using the output signals, the output signals being defined in a second color system different from the first color system.

11. A color conversion device as claimed in claim 10, wherein the first conversion characteristic is determined to convert a signal, defined in the first color system, into another signal defined in a third color system different from the first and second color systems, and wherein the second conversion characteristic is determined to convert the signal defined in the third color system into another signal defined in the second color system.

12. A color conversion device as claimed in claim 11, wherein the conversion process switching means includes:

first conversion process control means for controlling: the first color conversion means to convert the input signals, which are defined in the first color system, into first intermediate input signals which are defined in the third color system; and the second color conversion means to convert the first intermediate input signals into second intermediate input signals which are defined in the second color system and to output the second intermediate input signals as output signals; and second conversion process control means for controlling: the signal generation means to generate the representative signals; the first color conversion means to convert the representative signals, which are defined in the first color system, into first intermediate representative signals which are defined in the third color system; the second color conversion means to convert the first is intermediate representative signals into second intermediate representative signals which are defined in the second color system; and the third color conversion means to interpolate the second intermediate representative signals to thereby convert the input signals into the output signals.

13. A color conversion device as claimed in claim 12, wherein the first color system is a RGB color system, the second color system is a CMYK color system, and the third color system is a CIE color system.

14. A method of converting colors, the method comprising the steps of:

receiving input signals which spread in an input range;

generating representative signals within the input range of the input signals;

converting the representative signals into first intermediate representative signals with a first conversion characteristic;

converting the first intermediate representative signals into second intermediate representative signals with a second conversion characteristic; and converting the input signals into output signals with using the second intermediate representative signals.

15. A method as claimed in claim 14, further comprising the steps of:

detecting input of the input signals; and detecting whether the representative signals are completely generated, wherein the representative signals are generated after the input of the input signals is detected, and the input signals are converted into the output signals after the completion of the representative signal generation is detected.

16. A method as claimed in claim 14, further comprising the step of correcting at least one of the first conversion characteristic and the second conversion characteristic, wherein the representative signals are generated after the correction is completed.

17. A method as claimed in claim 14, wherein the input range is defined by a maximum value and a minimum value of the input signals, and the representative signals are generated through dividing the range between the maximum value and the minimum value.

18. A method as claimed in claim 14, wherein the input signals are defined in a first color system, the representative signals being produced according to the first color system, the output signals being defined in a second color system different from the first color system, the first intermediate representative signals being defined in a third color system different from the first and second color systems, the second intermediate representative signals being defined in the second color system, the output signals being calculated through interpolating the second intermediate representative signals.

19. A method as claimed in claim 18, wherein the first color system is a RGB color system, the second color system is a CMYK color system, and the third color system is a CIE color system.

20. A color conversion method for converting colors, the method comprising the steps of:

receiving input signals which spread within an input range;

comparing an amount of the input signals with an amount of representative signals to be produced during a second color conversion process;

selecting one of a first conversion process and the second conversion process based on the compared result; and performing a first conversion process when the first conversion process is selected and performing a second conversion process when the second conversion process is selected, the first conversion process including the steps of:
converting the input signals into first intermediate input signals with a first conversion characteristic; and
converting the first intermediate input signals into second intermediate input signals with a second conversion characteristic, thereby outputting the second intermediate input signals as output signals; and the second conversion process including the steps of:
generating representative signals of the input range;
converting the representative signals into first intermediate representative signals with the first conversion characteristic;
converting the first intermediate representative signals into second intermediate representative signals with the second conversion characteristic; and
converting the input signals into the output signals with using the second intermediate representative signals.

21. A method as claimed in claim 20, wherein the input signals are defined in a first color system, the representative signals being produced according to the first color system, the output signals being defined in a second color system different from the first color system, the first intermediate input signals and the first intermediate representative signals being defined in a third color system different from the first and second color systems, the second intermediate input signals and the second intermediate representative signals being defined in the second color system, the output signals being calculated through interpolating the second intermediate representative signals during the second conversion process.

22. A method as claimed in claim 21, wherein the first color system is a RGB color system, the second color system is a CMYK color system, and the third color system is a CIE color system.

* * * * *